US011452123B2

(12) United States Patent
Nguyen et al.

(10) Patent No.: US 11,452,123 B2
(45) Date of Patent: Sep. 20, 2022

(54) UPLINK CONTROL INFORMATION MULTIPLEXING WITH DYNAMIC PHYSICAL UPLINK SHARED CHANNEL SKIPPING

(71) Applicant: QUALCOMM Incorporated, San Diego, CA (US)

(72) Inventors: Bao Vinh Nguyen, San Diego, CA (US); Shailesh Maheshwari, San Diego, CA (US); Linhai He, San Diego, CA (US); Amir Aminzadeh Gohari, Sunnyvale, CA (US); Pranay Sudeep Rungta, San Diego, CA (US); Vishal Dalmiya, San Diego, CA (US); Dinesh Kumar Devineni, San Diego, CA (US); Krishna Chaitanya Mukkera, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/709,326

(22) Filed: Dec. 10, 2019

(65) Prior Publication Data

US 2021/0084673 A1    Mar. 18, 2021

Related U.S. Application Data

(60) Provisional application No. 62/901,619, filed on Sep. 17, 2019.

(51) Int. Cl.
  *H04W 72/12*  (2009.01)
  *H04L 5/02*   (2006.01)
  *H04L 5/00*   (2006.01)

(52) U.S. Cl.
  CPC ......... *H04W 72/1268* (2013.01); *H04L 5/001* (2013.01); *H04L 5/023* (2013.01); *H04W 72/1289* (2013.01)

(58) Field of Classification Search
  CPC ......... H04W 72/1268; H04W 72/1289; H04W 72/10; H04W 72/1247; H04W 74/0808;
  (Continued)

(56) References Cited

U.S. PATENT DOCUMENTS 10,187,878 B2   1/2019  Lin et al.
2017/0289968 A1 10/2017 Marco
(Continued)

FOREIGN PATENT DOCUMENTS

CN   108737311 A   11/2018
EP   2385736 A1   11/2011
(Continued)

OTHER PUBLICATIONS

International Search Report and Written Opinion—PCT/US2019/066051—ISA/EPO—dated Jun. 5, 2020.
(Continued)

*Primary Examiner* — Hardikkumar D Patel
(74) *Attorney, Agent, or Firm* — Patterson+ Sheridan, L.L.P.

(57) ABSTRACT

Certain aspects of the present disclosure provide techniques for sending uplink control information. A method that may be performed by a user equipment (UE) includes receiving an uplink grant for transmission on a plurality of physical uplink shared channels (PUSCHs), the plurality of PUSCHs being located on different component carriers (CCs); identifying one or more PUSCHs of the plurality of PUSCHs on which uplink control information (UCI) can be transmitted in a slot; assigning PUSCH data to the one or more identified PUSCHs on which the UCI can be transmitted before assigning PUSCH data to remaining PUSCHs of the plurality of PUSCHs; and transmitting the UCI and the PUSCH data in the slot on the assigned PUSCHs.

76 Claims, 19 Drawing Sheets

(58) Field of Classification Search
CPC . H04W 28/20; H04W 74/0816; H04W 48/16; H04W 72/0446; H04W 24/02; H04W 76/28; H04W 76/38; H04W 28/18; H04W 72/042; H04W 24/10; H04W 52/0216; H04W 4/08; H04W 52/0229; H04W 72/0406; H04W 36/0022; H04W 76/27; H04W 36/14; H04W 48/18; H04W 88/06; H04W 36/0083; H04L 5/001; H04L 5/023; H04L 1/1896; H04L 1/1657; H04L 5/006; H04L 5/0055; H04L 1/1812; H04L 1/1671; H04L 1/0026; H04L 1/0027; H04L 5/0053; H04L 5/0007; H04L 5/0091; H04L 5/0094; H04L 5/00; H04L 1/0072; H04L 1/0046; H04L 1/0038; H04B 7/0647; H04B 7/0626; H04B 17/336; Y02D 30/70

See application file for complete search history.

(56) References Cited

U.S. PATENT DOCUMENTS

| | | |
|---|---|---|
| 2017/0303267 A1 | 10/2017 | Shin et al. |
| 2018/0227939 A1* | 8/2018 | Bagheri ............ H04W 72/1268 |
| 2018/0302896 A1 | 10/2018 | Nayeb Nazar et al. |
| 2018/0324793 A1 | 11/2018 | Kim et al. |
| 2019/0261288 A1* | 8/2019 | Loehr .................... H04W 24/08 |
| 2021/0176776 A1* | 6/2021 | Choi ..................... H04L 1/0023 |

FOREIGN PATENT DOCUMENTS

| | | | |
|---|---|---|---|
| EP | 2579491 A2 * | 4/2013 | ........... H04L 1/0079 |
| EP | 2579491 A2 | 4/2013 | |
| EP | EP-2579491 A2 * | 4/2013 | ........... H04L 1/0079 |
| WO | 2017172165 A1 | 10/2017 | |
| WO | 2017194830 A1 | 11/2017 | |
| WO | 2018194352 A1 | 10/2018 | |

OTHER PUBLICATIONS

ETSI TS 138 300: "5G; NR; Overall Description; Stage-2(3GPP TS 38.300 version 15.4.0 Release 15)", V15.4.0 (Apr. 2019), 97 Pages.

* cited by examiner

UPLINK CONTROL INFORMATION MULTIPLEXING WITH DYNAMIC PHYSICAL UPLINK SHARED CHANNEL SKIPPING

CROSS-REFERENCE TO RELATED APPLICATION(S)

This application claims benefit of and priority to U.S. Provisional Patent Application No. 62/901,619, filed Sep. 17, 2019, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for sending uplink control information.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide improved handling for uplink control information (UCI) multiplexing in a physical uplink shared channel (PUSCH) when dynamic PUSCH skipping is configured.

Certain aspects provide a method for wireless communication by a user equipment (UE). The method generally includes receiving an uplink grant for transmission on a plurality of PUSCHs, the plurality of PUSCHs being located on different component carriers (CCs). The method generally includes identifying one or more PUSCHs of the plurality of PUSCHs on which UCI can be transmitted in a slot. The method generally includes assigning PUSCH data to the one or more identified PUSCHs on which the UCI can be transmitted before assigning PUSCH data to remaining PUSCHs of the plurality of PUSCHs and transmitting the UCI and the PUSCH data in the slot on the assigned PUSCHs.

Certain aspects provide a method for wireless communication by a UE. The method generally includes receiving an uplink grant for transmission on a plurality of PUSCHs in a slot, the plurality of PUSCHs being located on different CCs. The method generally includes determining whether PUSCH data is to be transmitted in the slot. The method generally includes determining, before assigning the PUSCH data to a PUSCH of the plurality of PUSCHs, to transmit UCI in the slot on one or more PUCCHs or on one or more PUSCHs of the plurality of PUSCHs based on the determination of whether the PUSCH data is to be transmitted in the slot. The method generally includes transmitting the UCI in the slot on the determined one or more PUCCHs or on the determined one or more PUSCHs.

Certain aspects provide an apparatus for wireless communication. The apparatus generally includes means for receiving an uplink grant for transmission on a plurality of PUSCHs, the plurality of PUSCHs being located on different CCs. The apparatus generally includes means for identifying one or more PUSCHs of the plurality of PUSCHs on which UCI can be transmitted in a slot. The apparatus generally includes means for assigning PUSCH data to the one or more identified PUSCHs on which the UCI can be transmitted before assigning PUSCH data to remaining PUSCHs of the plurality of PUSCHs and means for transmitting the UCI and the PUSCH data in the slot on the assigned PUSCHs.

Certain aspects provide an apparatus for wireless communication. The apparatus generally includes means for receiving an uplink grant for transmission on a plurality of PUSCHs in a slot, the plurality of PUSCHs being located on different CCs. The apparatus generally includes means for determining whether PUSCH data is to be transmitted in the slot. The apparatus generally includes means for determining, before assigning the PUSCH data to a PUSCH of the plurality of PUSCHs, to transmit UCI in the slot on one or more PUCCHs or on one or more PUSCHs of the plurality of PUSCHs based on the determination of whether the PUSCH data is to be transmitted in the slot. The apparatus generally includes means for transmitting the UCI in the slot on the determined one or more PUCCHs or on the determined one or more PUSCHs.

Certain aspects provide an apparatus for wireless communication. The apparatus generally includes a memory and at least one processor coupled with the memory. The at least one processor is generally configured to receive an uplink grant for transmission on a plurality of PUSCHs, the plurality of PUSCHs being located on different CCs. The at least one processor is generally configured to identify one or more PUSCHs of the plurality of PUSCHs on which UCI can be transmitted in a slot. The at least one processor is generally configured to assign PUSCH data to the one or more identified PUSCHs on which the UCI can be transmitted before assigning PUSCH data to remaining PUSCHs of the plurality of PUSCHs and to transmit the UCI and the PUSCH data in the slot on the assigned PUSCHs.

Certain aspects provide an apparatus for wireless communication. The apparatus generally includes a memory and at least one processor coupled with the memory. The at least one processor is generally configured to receive an uplink grant for transmission on a plurality of PUSCHs in a slot, the plurality of PUSCHs being located on different CCs. The at least one processor is generally configured to determine whether PUSCH data is to be transmitted in the slot. The at least one processor is generally configured to determine, before assigning the PUSCH data to a PUSCH of the plurality of PUSCHs, to transmit UCI in the slot on one or more PUCCHs on one or more PUSCHs of the plurality of PUSCHs based on the determination of whether the PUSCH data is to be transmitted in the slot. The at least one processor is generally configured to transmit the UCI in the slot on the determined one or more PUCCHs or on the determined one or more PUSCHs.

Certain aspects provide a computer readable medium storing computer executable code thereon for wireless communication. The computer readable medium generally includes code for receiving an uplink grant for transmission on a plurality of PUSCHs, the plurality of PUSCHs being located on different CCs. The computer readable medium generally includes code for identifying one or more PUSCHs of the plurality of PUSCHs on which UCI can be transmitted in a slot. The computer readable medium generally includes code for assigning PUSCH data to the one or more identified PUSCHs on which the UCI can be transmitted before assigning PUSCH data to remaining PUSCHs of the plurality of PUSCHs and code for transmitting the UCI and the PUSCH data in the slot on the assigned PUSCHs.

Certain aspects provide a computer readable medium storing computer executable code thereon for wireless communication. The computer readable medium generally includes code for receiving an uplink grant for transmission on a plurality of PUSCHs in a slot, the plurality of PUSCHs being located on different CCs. The computer readable medium generally includes code for determining whether PUSCH data is to be transmitted in the slot. The computer readable medium generally includes code for determining, before assigning the PUSCH data to a PUSCH of the plurality of PUSCHs, to transmit UCI in the slot on one or more PUCCHs or on one or more PUSCHs of the plurality of PUSCHs based on the determination of whether the PUSCH data is to be transmitted in the slot. The computer readable medium generally includes code for transmitting the UCI in the slot on the determined one or more PUCCHs or on the determined one or more PUSCHs.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
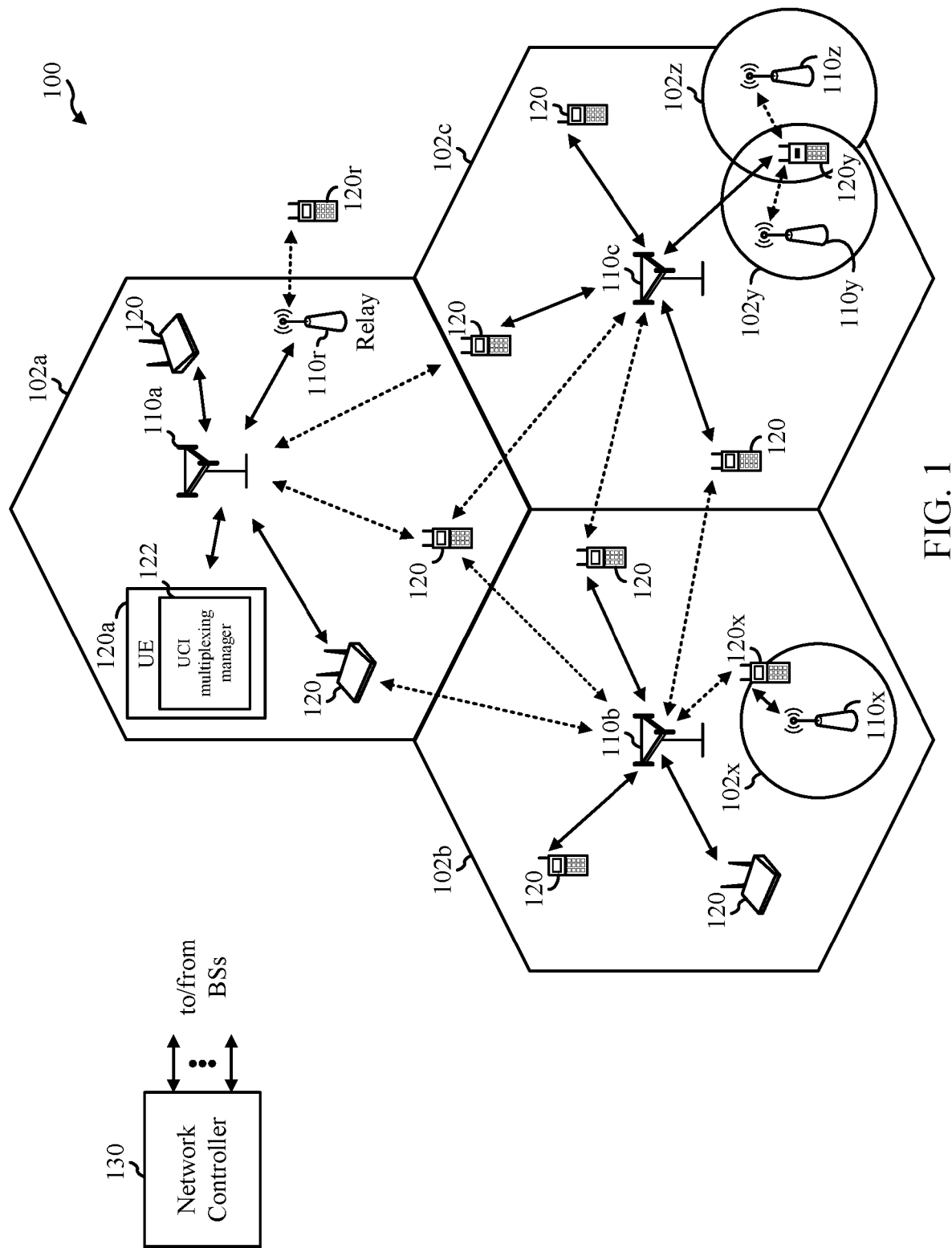
FIG. 1 is a block diagram conceptually illustrating an example telecommunications system, in accordance with certain aspects of the present disclosure.

Aspects of the present disclosure provide apparatus, methods, processing systems, and computer readable mediums for handling uplink control information (UCI) multiplexing in a physical uplink shared channel (PUSCH) when dynamic PUSCH skipping is configured.

In certain systems (e.g., new radio or 5G NR systems), a user equipment (UE) is configured to transmit uplink control information (UCI), which may include scheduling requests (SRs), hybrid automatic repeat request (HARQ) feedback (e.g., acknowledgments/negative acknowledgments or HARQ-ACK information), and/or channel state information (CSI) feedback, etc. The UE is also configured for data transmission on a PUSCH. The UE may be configured with multiple PUSCHs on different component carriers (CCs). In some cases, the UE may be scheduled to send data and UCI in an overlapping time period, such as in the same slot. The UE may transmit UCI in a physical uplink control channel (PUCCH). In some cases, however, the UE may transmit the UCI in the PUSCH (e.g., instead of on the PUCCH), when the UCI and PUSCH are overlapping in time. For example, when the UE determines that PUSCH is scheduled at a given time and the UE has UCI to send at that time, the UE is configured to multiplex the UCI (e.g., with uplink data) in the PUSCH.

In certain systems (e.g., new radio or 5G NR systems), the UE may be configured to skip transmission of PUSCHs which do not have any assigned data (e.g., dynamically when the UE does not have uplink data to send on the PUSCH at the scheduled time of the PUSCH). As used herein, PUSCH skipping may refer to the UE dropping, or not transmitting, on certain PUSCHs (e.g., the certain PUSCHs may include PUSCHs that were assigned via an uplink grant to the UE for uplink transmission). The PUSCH skipping may be based on configured skipping rules. In some scenarios, the UE may not know that PUSCH will be skipped when the UE decides to multiplex the UCI in a PUSCH. In such a scenario, the UE may fall back to transmitting the UCI on the PUCCH. This may reduce efficiency, for example, by increasing the time and power consumption for transmitting the UCI.

Aspects of the present disclosure provide solutions for multiplexing UCI on PUSCH when PUSCH skipping is configured. For example, aspects provide for the UE to check whether there is uplink data for transmission before multiplexing the UCI in the PUSCH. Thus, according to certain aspects, when there is no uplink data, the UE can put the UCI on the PUCCH. In this manner, the UE avoids preparing the UCI on the PUSCH and then falling back to sending the UCI on the PUCCH when the UE determines to skip the PUSCH. Also, when there is uplink data, the UE can assign the data to the PUSCHs on which UCI can be multiplexed before assigning data to the other PUSCHs. In this way, the UE can ensure that the UCI can be multiplexed on the PUSCH in the slot because the PUSCH with data will not be skipped. In some examples, the multiplexed UCI may puncture PUSCH (e.g., the PUSCH data is rate-matched). In some examples, the UCI may be punctured into the PUSCH when (e.g., only when) the number of UCI bits to be transmitted are for a small amount of UCI data, such as below a threshold number of UCI bits (e.g., equal to or less than 2 bits UCI). For larger amounts of UCI data (e.g., above the threshold), then the UCI may be multiplexed by rate matching the PUSCH. For example, the puncturing or rate-matching may be performed as defined in a wireless standard (e.g., in an IEEE wireless standard). By multiplexing UCI bits onto the PUSCH, the effective code rate of the PUSCH may be increased. Rate matching a high number of UCI bits (e.g., rather than puncturing them) in some cases (e.g., when polar coding is used for the transmission) may result in a lower effective code rate for the PUSCH (e.g., as compared to puncturing).

Thus, in one or more aspects, the UE receives an uplink grant for transmission on multiple PUSCHs in a slot. The PUSCHs are located on different component carriers (CCs). The UE identifies the PUSCHs on which UCI can be transmitted in the slot. Then, the UE assigns PUSCH data to those identified PUSCHs before assigning PUSCH data to the remaining PUSCHs. The UE transmits the UCI and the PUSCH data in the slot on the assigned PUSCHs.

In one or more aspects, the UE may receive an uplink grant for multiple PUSCHs in a slot. The multiple PUSCHs are located on different CCs. The UE can determine whether PUSCH data is to be transmitted in the slot. Based on the whether there is PUSCH data, the UE can determine, before assigning the PUSCH data to any of the PUSCHs, to transmit UCI in the slot on PUCCH or on PUSCH. The UE transmits the UCI in the slot on the determined PUCCH or PUSCH.

The following description provides examples of UCI multiplexing in a PUSCH when dynamic PUSCH skipping is configured in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the UEs 120 may be configured for UCI multiplexing and PUSCH skipping. As shown in FIG. 1, the UE 120a includes a UCI multiplexing manager 122. The UCI multiplexing manager 122 may be configured for UCI multiplexing with PUSCH skipping, in accordance with aspects of the present disclosure. In some examples, the UCI multiplexing manager 122 may receive an uplink grant for transmission on a plurality of PUSCHs, the plurality of PUSCHs may be located on different CCs. The UCI multiplexing manager 122 may further identify one or more PUSCHs of the plurality of PUSCHs on which UCI can be transmitted in a slot. Additionally, the UCI multiplexing manager 122 may also assign PUSCH data to the one or more identified PUSCHs on which the UCI can be transmitted before assigning PUSCH data to remaining PUSCHs of the plurality of PUSCHs. The UCI multiplexing manager 122 can further transmit the UCI and the PUSCH data in the slot on the assigned PUSCHs. In some examples, the UCI multiplexing manager 122 may receive an uplink grant for transmission on a plurality of PUSCHs in a slot. The plurality of PUSCHs are located on different CCs. The UCI multiplexing manager 122 may determine whether PUSCH data is to be transmitted in the slot. The UCI multiplexing manager 122 may determine, before assigning the PUSCH data to a PUSCH of the plurality of PUSCHs, to transmit UCI in the slot on one or more PUCCHs or on one or more PUSCHs of the plurality of PUSCHs based on the determination of whether the PUSCH data is to be transmitted in the slot. The UCI multiplexing manager 122 may transmit the UCI in the slot on the determined one or more PUCCHs or on the determined one or more PUSCHs.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be coupled to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
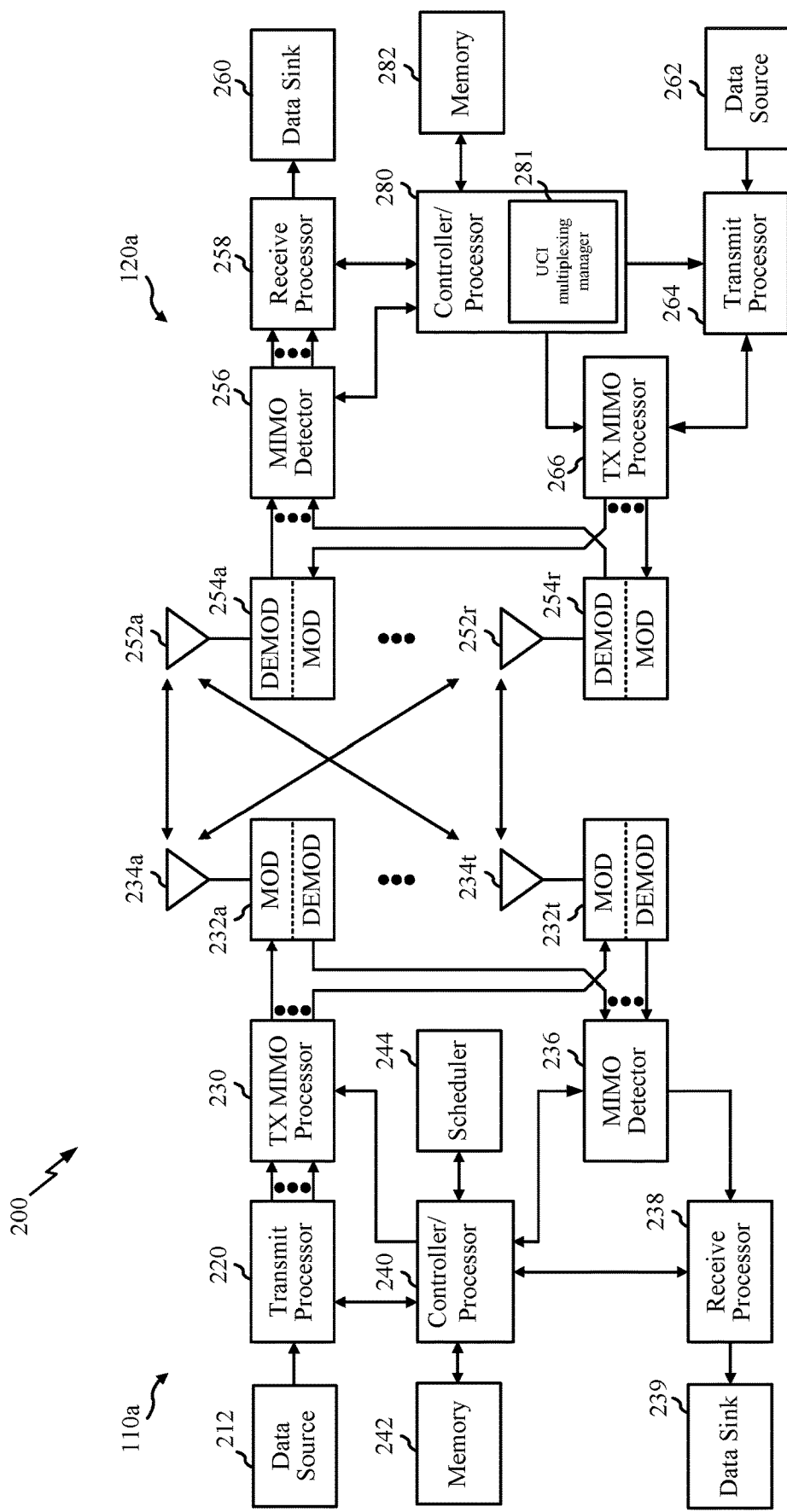
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 280 of the UE 120a has a UCI multiplexing manager 281 that may be configured for UCI multiplexing in PUSCH handling when PUSCH skipping is configured, according to aspects described herein. Although shown at the controller/processor 280, other components of the UE 120a may be used for performing the operations described herein.

Figure 3A:
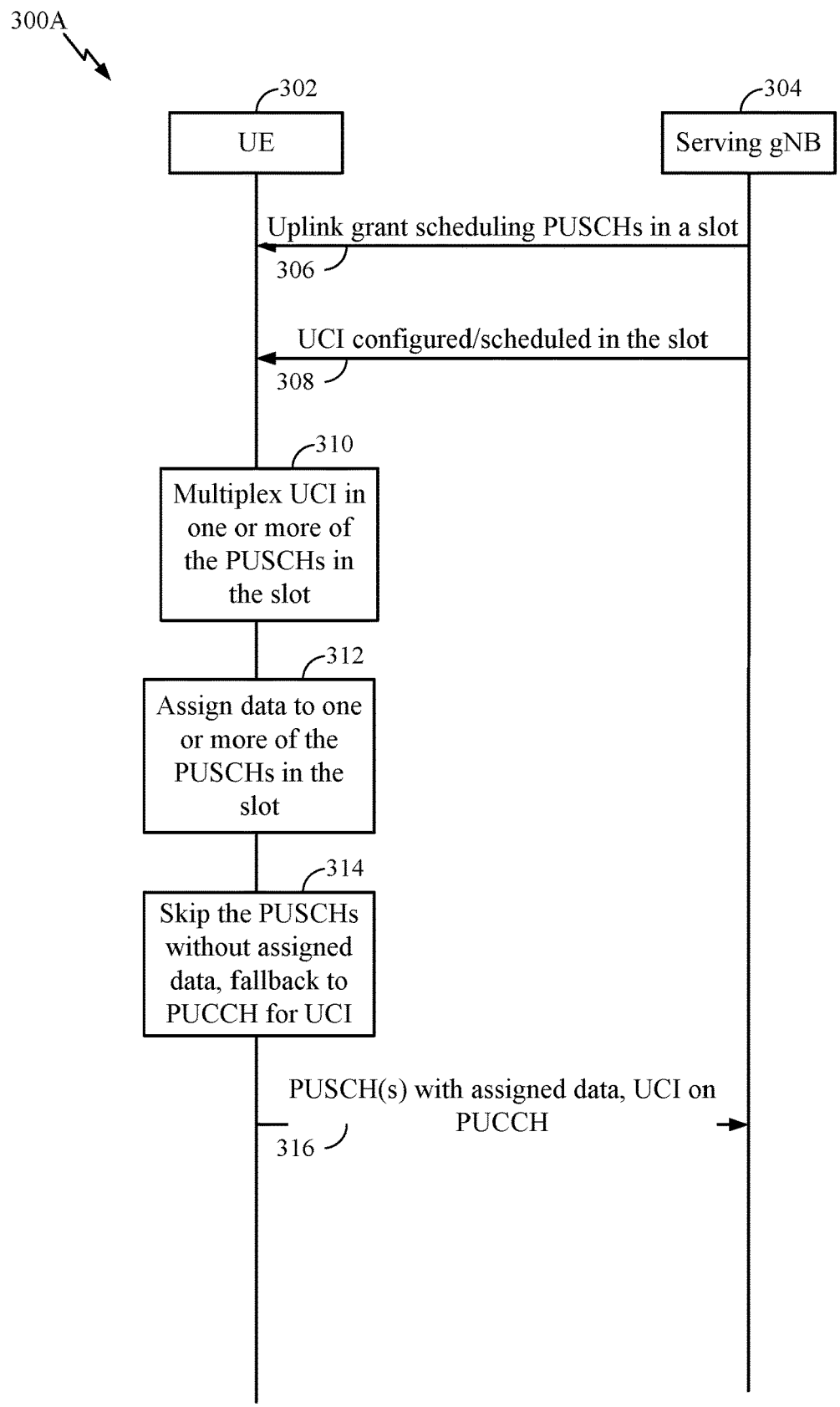
FIG. 3A is a call flow diagram illustrating example uplink control information (UCI) fallback to a physical uplink control channel (PUCCH) with physical uplink shared channel (PUSCH) skipping.
Figure 3B:
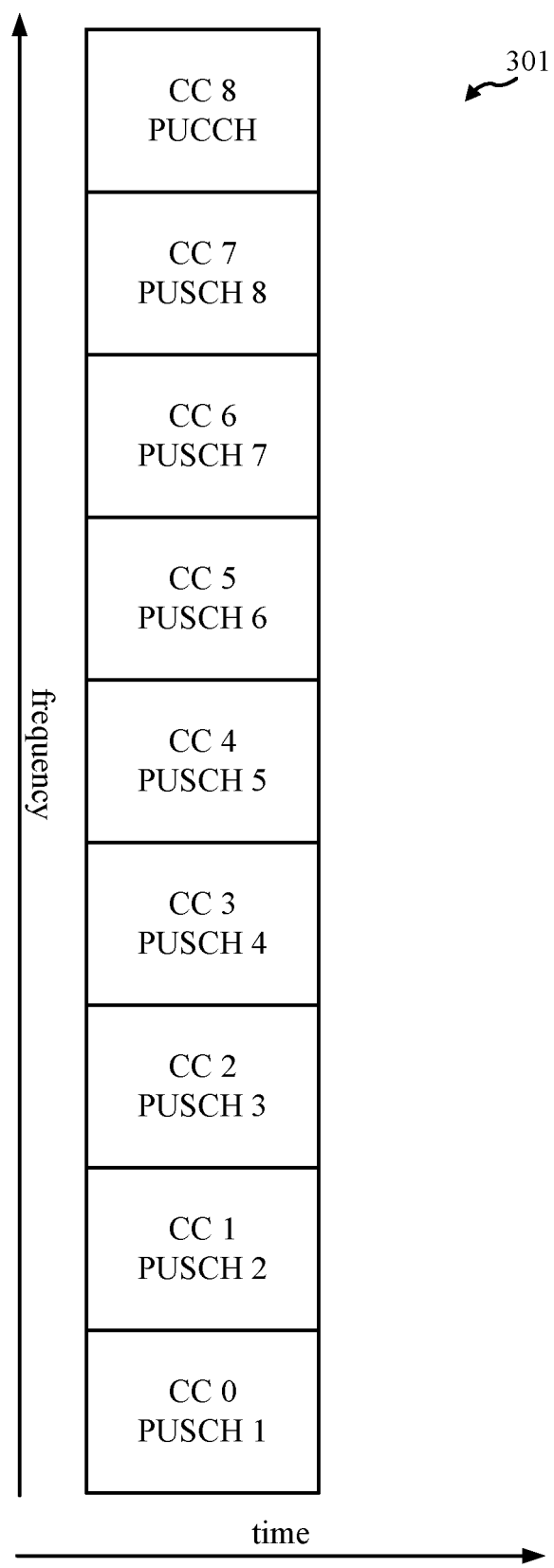
FIG. 3B is a block diagram showing example overlapping PUSCH(s) and PUCCH configured in a slot.
Figure 3C:
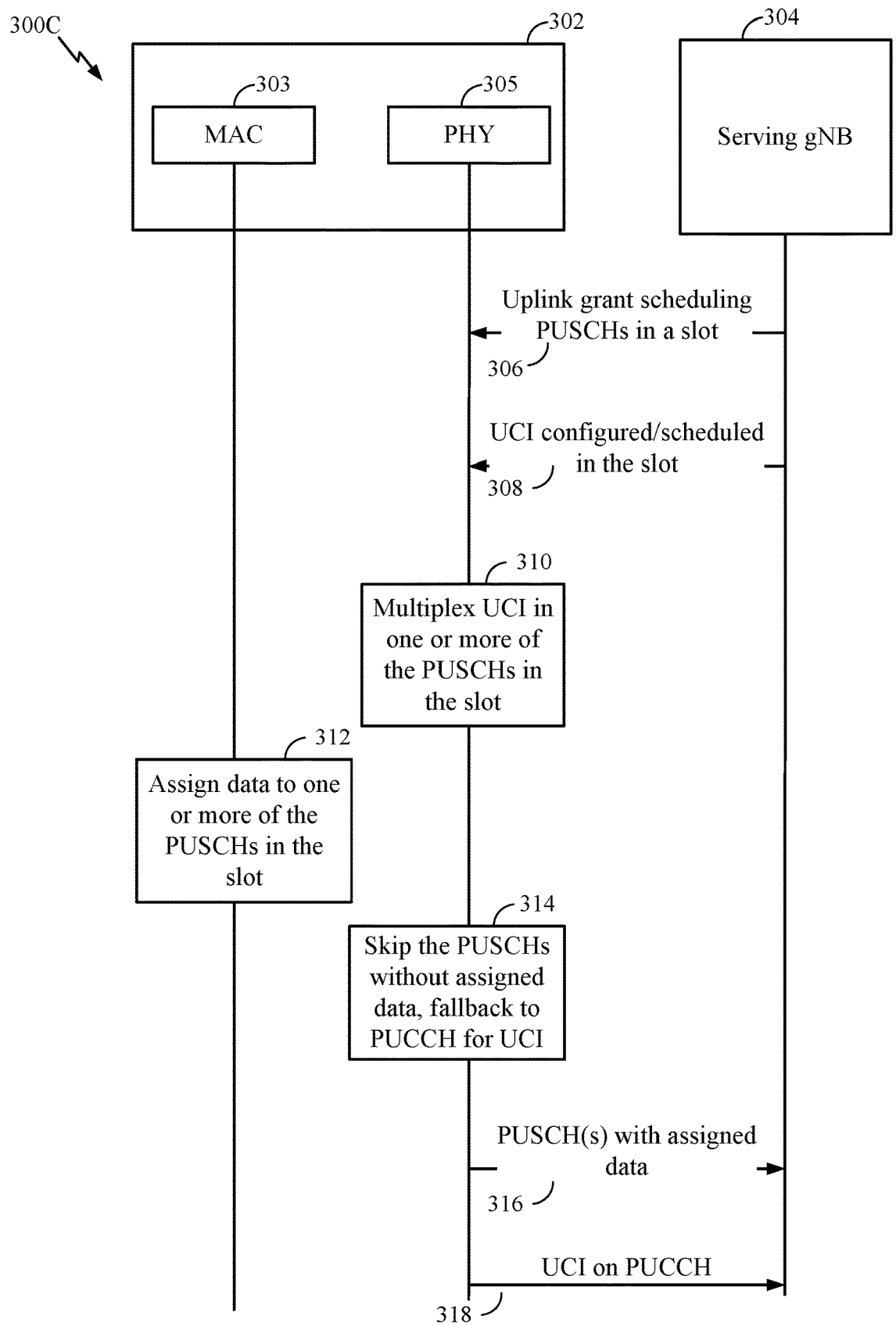
FIG. 3C is a more detailed call flow diagram illustrating the example UCI fallback to PUCCH with PUSCH skipping in FIG. 3A.

As discussed above, a UE may be configured for UCI multiplexing and PUSCH skipping, which may be problematic if the UE determines to send UCI in a PUSCH, and then the PUSCH is skipped due to the PUSCH not having any assigned data. FIG. 3A is a call flow 300A illustrating example UCI fallback to a PUCCH with PUSCH skipping. FIG. 3C is a more detailed call flow 300C illustrating the example UCI fallback to a PUCCH with PUSCH skipping.

As shown in FIG. 3A, at 306, the UE 302 receives an uplink grant (e.g., in a PDCCH) from the serving gNB 304 scheduling PUSCHs in a slot. Different PUSCHs may be scheduled on different CCs in the slot. In an illustrative example, the UE 302 is scheduled (e.g., at 306) with eight PUSCHs (PUSCH 1, PUSCH 2, ..., PUSCH 8) in a given slot 301 and at least one PUCCH as shown in FIG. 3B. As shown in FIG. 3B, the PUSCH 1-8 are configured on different CCs, such as CC 0-CC 7 in the slot 301.

At 308, the UE 302 is configured/scheduled by the serving gNB 304 to send UCI (e.g., HARQ-ACK, SR, and/or CSI) in the slot. Although in FIG. 3A, the UCI configuring/scheduling (at 308) is shown after the uplink grant scheduling the PUSCHs (at 306), in one or more examples, the UCI could be configured/scheduled before or at the same time as the uplink grant scheduling the PUSCHs. In some examples, the UCI may be dynamically scheduled. In some examples, the UE 302 may be configured with a timeline, trigger, or periodicity for sending the UCI.

Figure 3D:
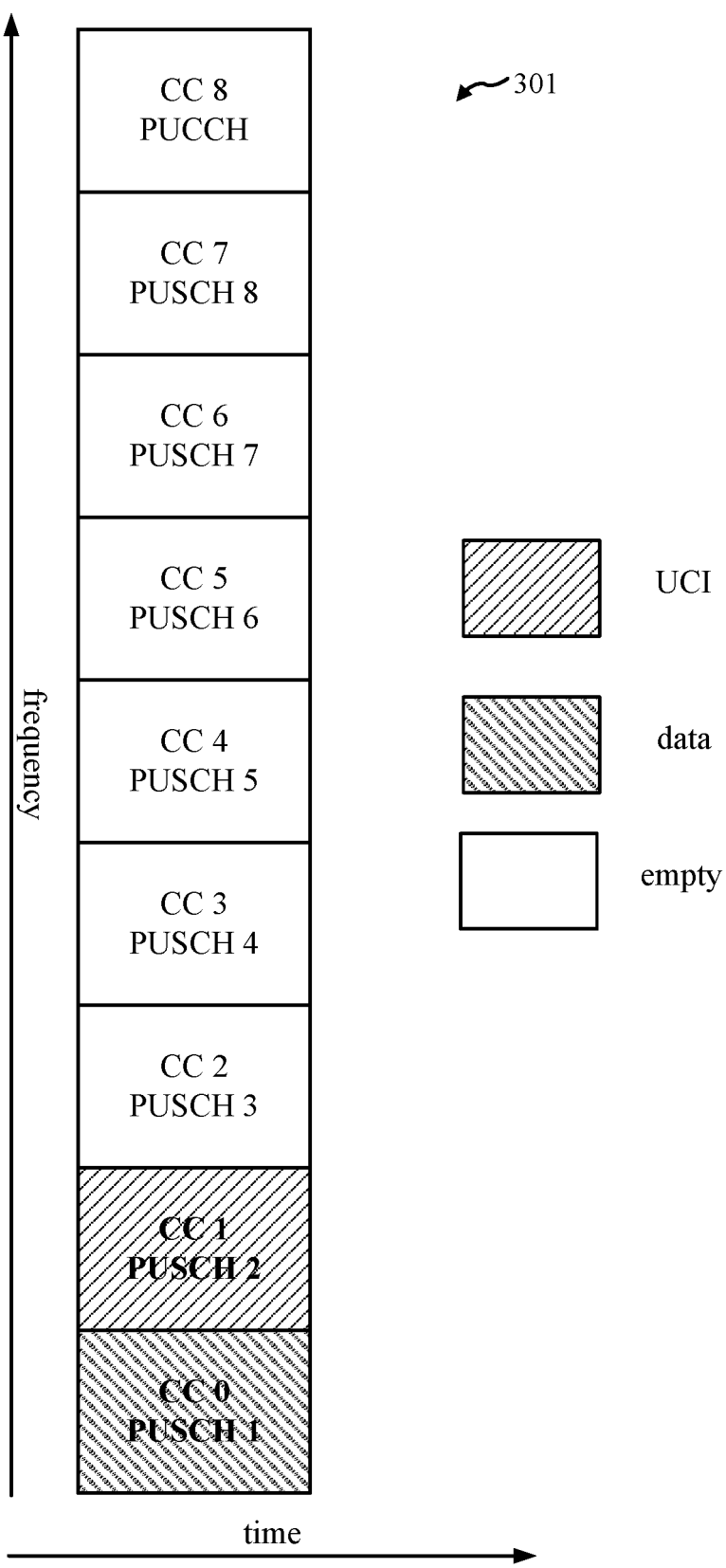
FIG. 3D is a block diagram showing example UCI multiplexed in a PUSCH and data assigned to another PUSCH in the slot.

At 310, the UE 302 determines to multiplex UCI in one or more of the PUSCHs scheduled in the slot (e.g., when the PUSCH and PUCCH are both scheduled in the slot). For example, the UE 302 can run its multiplexing logic to determine in which PUSCHs the UCI can be transmitted. The UE 302 may be configured with rules for determining whether UCI can be transmitted in a PUSCH. In some examples, the UCI multiplexing rules are hardcoded at the UE 302 according to the 3GPP technical standards (e.g., 38.213 v15.4.0, Section 9.3, specifies various rules for transmitting UCI on PUSCH). In some examples, the PUSCH that can be multiplexed with UCI can be configured. As shown in FIG. 3C, the UCI multiplexing, at 310, may be done at the PHY layer 305 of the UE 302. In the illustrative example, based on UCI multiplexing rules, the UE 302 determines (at 310) to multiplex UCI on the PUSCH 2, as shown in FIG. 3D.

At 312, the UE 302 assigns data (e.g., upper medium access control (MAC) protocol data units (PDUs)) to one or more of the scheduled PUSCHs. As shown in FIG. 3C, the data assigning, at 312, may be done at the MAC layer 303 of the UE 302. In the illustrative example, the UE 302 has (e.g., at the MAC layer) only a small amount of data to send, and the UE 302 builds the PUSCH 1 with the data (at 312), and does not have data to fill the remaining PUSCH b 2-8, as shown in FIG. 3D.

Figure 3E:
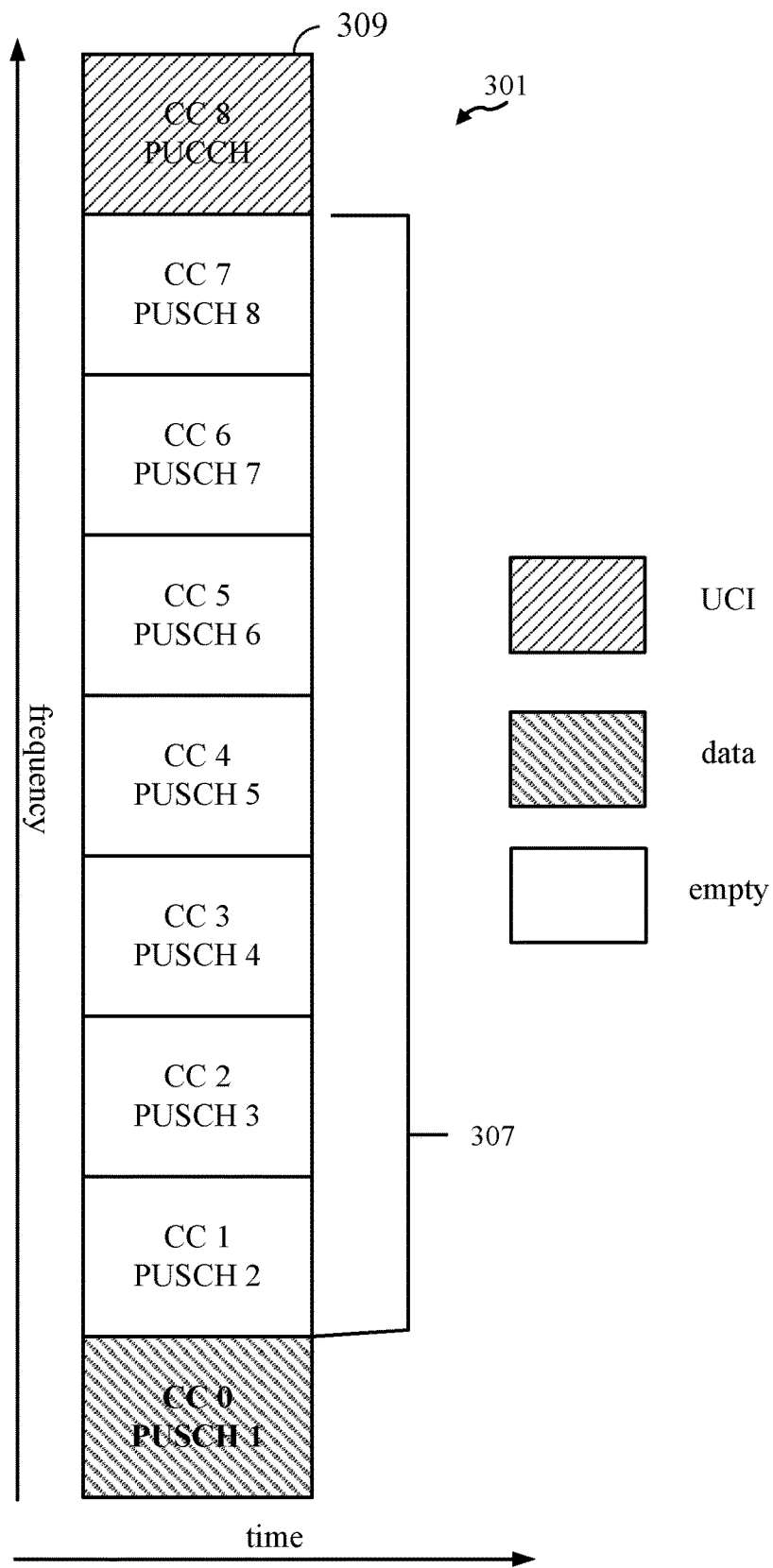
FIG. 3E is a block diagram showing example UCI fallback to the PUCCH in the slot.
Figure 3F:
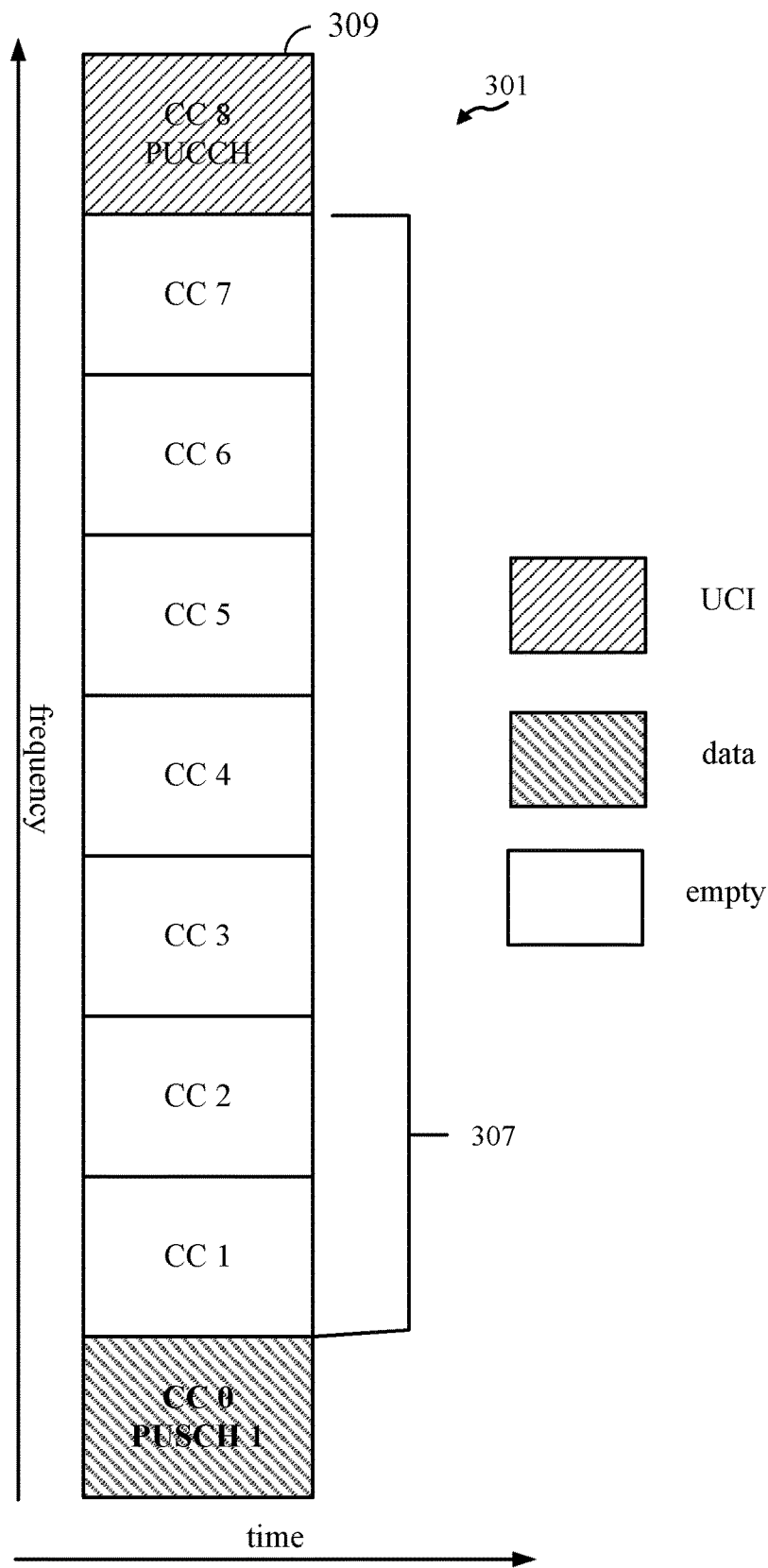
FIG. 3F is a block diagram showing the example UCI fallback to the PUCCH and PUSCH skipping in the slot.

In one example, the UE 302 may be configured for PUSCH skipping (e.g., via radio resource control (RRC) signaling). At 314, the UE 302 determines to skip PUSCHs (e.g., drop or not transmit) in the slot that do not have PUSCH data assigned for transmission in the slot. For example, the UE 302 may be configured not to transmit PUSCH with just padding or with UCI only, but to only transmit PUSCH when there is PUSCH data to be transmitted on that PUSCH. However, PUSCH skipping may complicate UCI transmission if the PUSCH data assignment and/or skipping is not known to the UE when the UCI multiplexing is determined. For example, as shown in FIG. 3A, when the UE 302 determines (e.g., at the PHY layer) to multiplex UCI on a PUSCH (at 310) and the UE 302 does not assign (e.g., at the MAC layer) any data to the PUSCH (at 312) and, therefore, determines to skip that PUSCH (at 314), then the UE 302 has to fall back (e.g., at the PHY layer) to transmitting the UCI on PUCCH. Thus, at 316, the UE 302 transmits the PUSCHs with assigned data (skipping the PUSCHs without any data) in the slot and, at 318, the UE transmits the UCI on PUCCH 305 in the slot. As shown in FIG. 3C, the skipping at 314 may be done at the PHY layer 305, after the PHY layer 305 has made the UCI multiplexing decision at 310. In the illustrative example in FIGS. 3A-3E, the UE 302 can transmit the PUSCH 1, but drops the PUSCHs 2-8 according to configured PUSCH skipping, and the UE 302 falls back to transmitting the UCI on the PUCCH (at 314). In this case, both PUCCH and PUSCH are transmitted in the slot (at 316 and 318), as shown in FIG. 3E, and the remaining PUSCHs 303 are dropped (skipped), as shown in FIG. 3F.

Therefore, additional PUCCH/PUSCH resources may be used (e.g., because both PUSCH and PUCCH are transmitted) and there may be additional delay (e.g., due to falling back to prepare the PUCCH), which in turn may incur additional power consumption.

Example UCI Multiplexing with PUSCH Skipping

In some examples, before physical uplink shared channel (PUSCH) skipping and multiplexing uplink control information (UCI) on PUSCH, the physical (PHY) layer may check the medium access control (MAC) layer to determine whether the MAC layer has data to transmit (e.g., to schedule, to assign to PUSCH). In some examples, the PHY layer sends a query (e.g., or a direct function call) to the MAC layer and the MAC layer sends a response indicating whether there is MAC layer data. For example, the PHY layer may send the query to the MAC layer at or prior to a time when the UE initiates skipping logic (e.g., when the UE determines the PUSCH/PUCCH overlap and determines which PUSCH to skip based on configured skipping rules) and at or prior to a time when the multiplexing decision is made. In one example, the PUSCH/PUCCH overlap in a slot can be determined based on scheduling information received by the UE (if the PUSCH and/or PUCCH is configured with bundling/repetitions, this can be taken into account in determining whether PUSCH and/or PUCCH is scheduled in a slot). In some examples, additionally or alternatively, the MAC layer could tell the PHY layer when the MAC layer has data. For example, the MAC layer may periodically notify the PHY layer whether the MAC layers has data and/or the MAC layer may notify the UE any time new data arrives at the MAC layer.

As will be discussed in more detail below with respect to FIGS. 6A-6C, if the MAC layer data is empty (e.g., the MAC layer does not have PUSCH data to transmit/assign), then all PUSCHs will be skipped and UCI will be transmitted by PUCCH. Thus, the UE may not first attempt to multiplex the UCI on the PUSCH and then later fall back to PUCCH. As will be discussed in more detail below with respect to FIGS. 7A-7C, if the MAC layer data is not empty (e.g., the MAC layer has PUSCH data to transmit/assign to PUSCH), then the PHY layer may request the MAC layer to put (e.g., assign/transmit) data (e.g., MAC protocol data unit (PDU)) first on PUSCHs that can multiplex UCI, then on one or more remaining PUSCHs. For example, there may be multiple PUSCHs scheduled. The PUSCHs are ordered for assigning the data. The MAC layer can order the PUSCHs based on the request from the PHY layer, in order to assign data first to the PUSCHs that can multiplex UCI (e.g., based on the UCI multiplexing rules). In some examples, the PHY layer can send the upper layer (e.g., MAC), an ordered list of PUSCHs to be built for the slot. The MAC layer may build the PUSCHs (e.g., assign data such as MAC layer transport blocks (TBs) to the PUSCHs) in the order of the list. When the PHY layer sends the list, the PHY layer may order the list with the PUSCHs that can multiplex UCI ordered first in the list. In some examples, the PHY layer can send a list of the PUSCHs, and an indication of which PUSCH should be built first. Thus, the UCI multiplexing decision at the UE PHY layer may take into account whether there is MAC layer data to be sent (e.g., in addition to the multiplexing rules).

By avoiding UCI fallback to PUCCH and/or by ensuring multiplexing of the UCI on PUSCH, the UE can save resources and power. Because the UE knows whether there is data, the PHY can determine whether to multiplex UCI on PUSCH before the uplink PUSCH skipping is determined. In this case, the UE can build the data PDU, for example the MAC layer TB, and also perform the PHY layer data/UCI multiplexing in parallel with forming the data PDU. Thus, the uplink PHY timeline can be improved. Further, by assigning data to the PUSCH that can multiplex UCI, in one or more examples, multiple PUSCHs may be transmitted in a slot (with overlapping PUCCH), carrying UCI (e.g., with grant size of more than 2 k bytes), even when there is a small MAC PDU.

Figure 4:
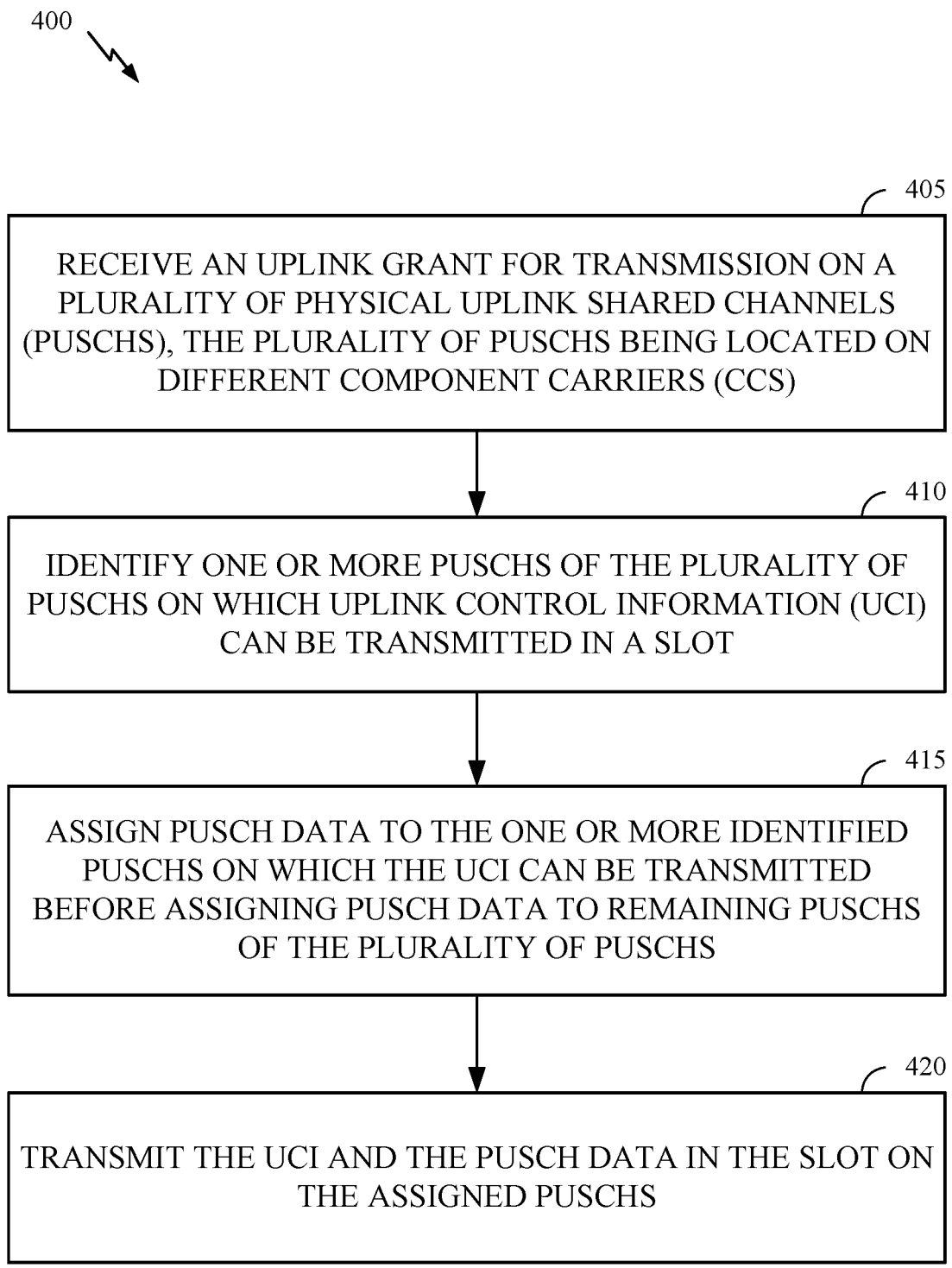
FIG. 4 is a flow diagram illustrating example operations for wireless communication by a UE, in accordance with certain aspects of the present disclosure.

FIG. 4 is a flow diagram illustrating example operations 400 for wireless communication, in accordance with certain aspects of the present disclosure. The operations 400 may be performed, for example, by UE (e.g., such as a UE 120a in the wireless communication network 100). Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at 405, by receiving an uplink grant for transmission on a plurality of PUSCHs, the plurality of PUSCHs being located on different component carriers (CCs).

At 410, the UE identifies one or more PUSCHs of the plurality of PUSCHs on which UCI can be transmitted in a slot. In some examples, the UE identifies the one or more PUSCHs on which the UCI can be transmitted based, at least in part, on one or more preconfigured rules. In some examples, the UE identifies the one or more PUSCHs on which the UCI can be transmitted based, at least in part, on a configuration of a PUCCH. For example, the PUCCH may schedule the UCI for a CC and the UE may determine a PUSCH scheduled for the CC as a PUSCH that can multiplex UCI.

At 415, the UE assigns PUSCH data to the one or more identified PUSCHs on which the UCI can be transmitted before assigning PUSCH data to remaining PUSCHs of the plurality of PUSCHs. According to certain aspects, the UE determines that the PUSCH data is to be transmitted in the slot. For example, the UE determines that the PUSCH data is to be transmitted in the slot before identifying the one or more PUSCHs, of the plurality of PUSCHs, on which the UCI can be sent and before assigning the PUSCH data. In some examples, the UE receives an indication corresponding to the PUSCH data at the PHY layer from a MAC layer. In some examples, the UE receives the indication corresponding to the PUSCH in response to a query from the PHY layer to the MAC layer. In some examples, the UE periodically receives the indication corresponding to the PUSCH at the PHY layer from the MAC layer. In some examples, the UE receives the indication corresponding to the PUSCH at the PHY layer from the MAC layer when new data is received at the MAC layer. In some examples, the UE receives the indication corresponding to the PUSCH in some combination of in response to the query, periodically, and/or when new data is received at the MAC layer.

At 420, the UE transmits the UCI and the PUSCH data in the slot on the assigned PUSCHs. In some examples, the UE rate-matches the UCI around the PUSCH data. In some examples, the UE generates a MAC layer TB and performs PHY layer multiplexing of the UCI and PUSCH data in parallel. In some examples, the UE skips transmission of at least one empty PUSCH of the set of PUSCHs.

Figure 5:
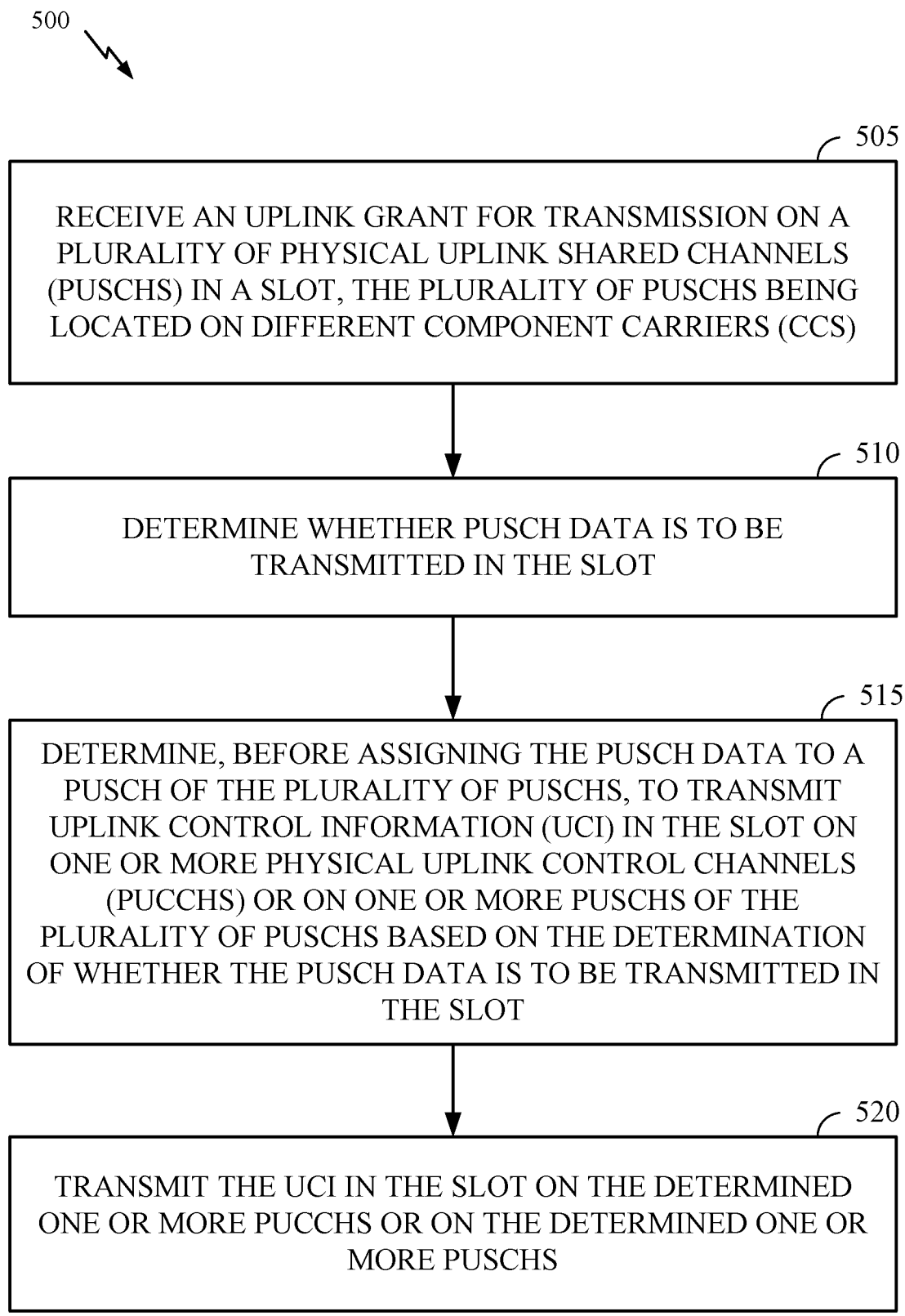
FIG. 5 is a flow diagram illustrating example operations for wireless communication by a UE, in accordance with certain aspects of the present disclosure.

FIG. 5 is a flow diagram illustrating example operations 500 for wireless communication, in accordance with certain aspects of the present disclosure. The operations 500 may be performed, for example, by UE (e.g., such as a UE 120a in the wireless communication network 100). Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at 505, by receiving an uplink grant for transmission on a plurality of PUSCHs in a slot, the plurality of PUSCHs being located on different CCs.

At 510, the UE determines whether PUSCH data is to be transmitted in the slot. In some examples, the UE receives an indication at a PHY layer from a MAC layer in response to a query from the PHY layer to the MAC layer. In some examples, the UE periodically receives the indication at the PHY layer from the MAC layer. In some examples, the UE receives the indication at the PHY layer from the MAC layer when new data is received at the MAC layer. According to certain aspects, the UE determines to transmit the UCI in the slot on the one or more PUCCHs when the one or more PUSCHs are empty (e.g., when there is no data to be transmitted in the PUSCHs in the slot). According to certain aspects, the UE determines to transmit the UCI in the slot on the one or more PUSCHs when the PUSCH data is to be transmitted in the slot.

At 515, the UE determines, before assigning the PUSCH data (e.g., any PUSCH data) to a PUSCH of the plurality of PUSCHs, to transmit UCI in the slot on one or more PUCCHs or on one or more PUSCHs of the plurality of PUSCHs based on the determination of whether the PUSCH data is to be transmitted in the slot.

According to certain aspects, the UE identifies one or more PUSCHs, of the plurality of PUSCHs, on which the UCI can be transmitted, and the UE assigns PUSCH data to those PUSCHs on which the UCI can be transmitted before assigning PUSCH data to the remaining PUSCHs. In some examples, the UE requests, by a PHY layer, a MAC layer to assign PUSCH data on the PUSCHs on which the UCI can be sent before assigning PUSCH data on the remaining PUSCHs. In some examples, the UE provides, by the PHY layer, to the MAC layer, an ordered list to build the set of PUSCHs. The identified PUSCHs, on which the UCI can be transmitted, may be ordered in the ordered list before the remaining PUSCHs. In some examples, the UE identifies the PUSCHs on which the UCI can be transmitted based, at least in part, on one or more preconfigured rules. In some examples, the UE identifies the PUSCHs on which the UCI can be transmitted based, at least in part, on a configuration of a PUCCH.

At 520, the UE transmits the UCI in the slot on the determined one or more PUCCHs or on the determined one or more PUSCHs. In some examples, the UE sends UCI in the slot on both one or more PUCCHs and one or more PUSCHs. In some examples, the UE rate-matches the UCI around the PUSCH data. In some examples, the UE generates a MAC layer TB and performs PHY layer multiplexing of the UCI and PUSCH data in parallel. In some examples, the UE skips transmission of at least one empty PUSCH.

As mentioned above, the UE can perform a check (e.g., a PHY layer check) to determine whether there is data (e.g., MAC layer data) to transmit in a duration (e.g., in a transmission time interval, such as in a slot). Thus, if there is no data to be transmitted (e.g., there is no MAC layer data or the MAC layer buffer is empty), then all of the PUSCHs may be skipped (e.g., according to a configured PUSCH skipping rule). In this case, the UE may decide to send the UCI on the PUCCH in the slot. FIG. 6A is a call flow 600A illustrating example UCI transmission on PUCCH with PUSCH skipping, in accordance with one or more aspects of the present disclosure. FIG. 6B is a more detailed call flow 600B illustrating the example UCI transmission on PUCCH with PUSCH skipping.

Figure 6A:
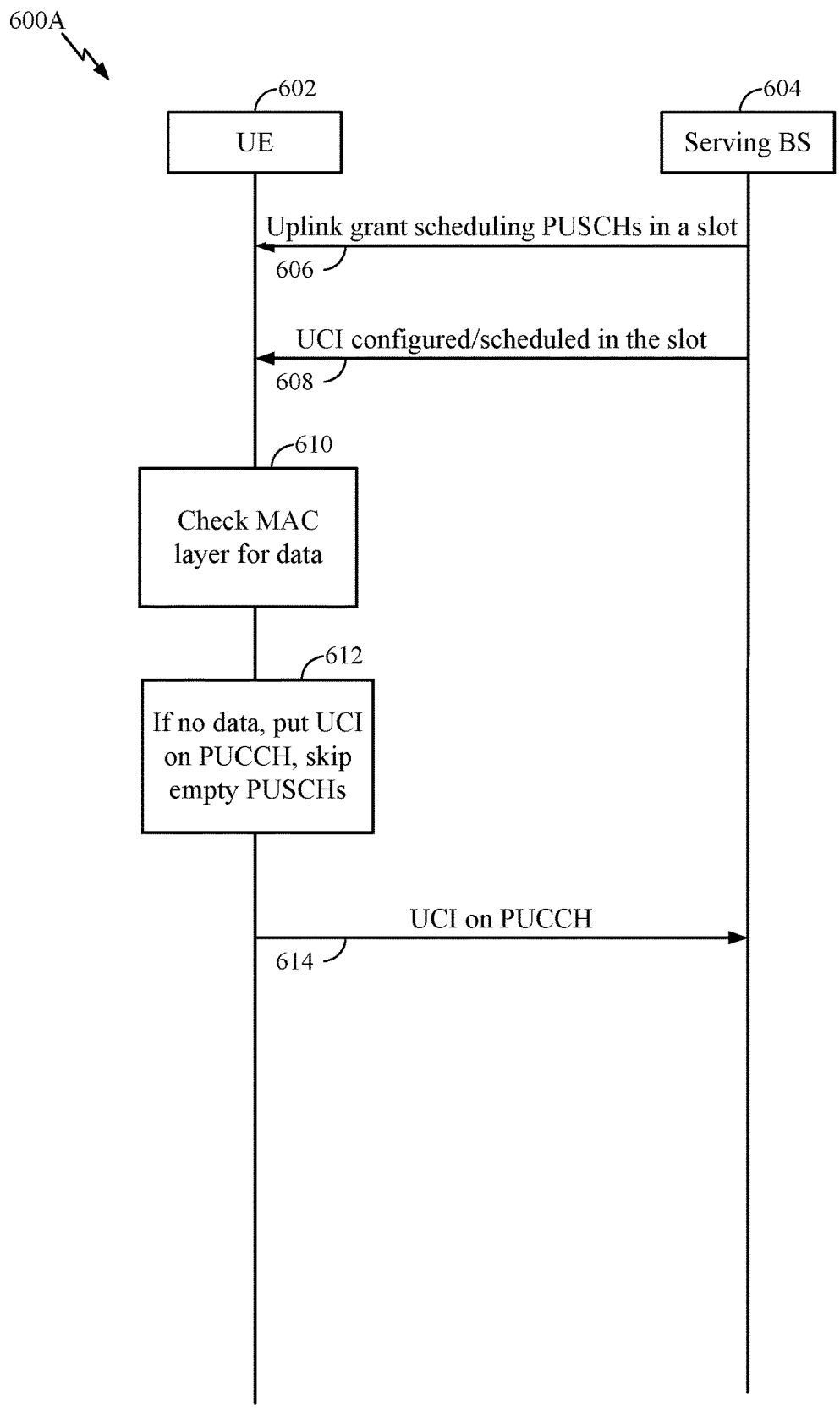
FIG. 6A is a call flow diagram illustrating example UCI transmission on PUCCH with PUSCH skipping, in accordance with aspects of the present disclosure.
Figure 6B:
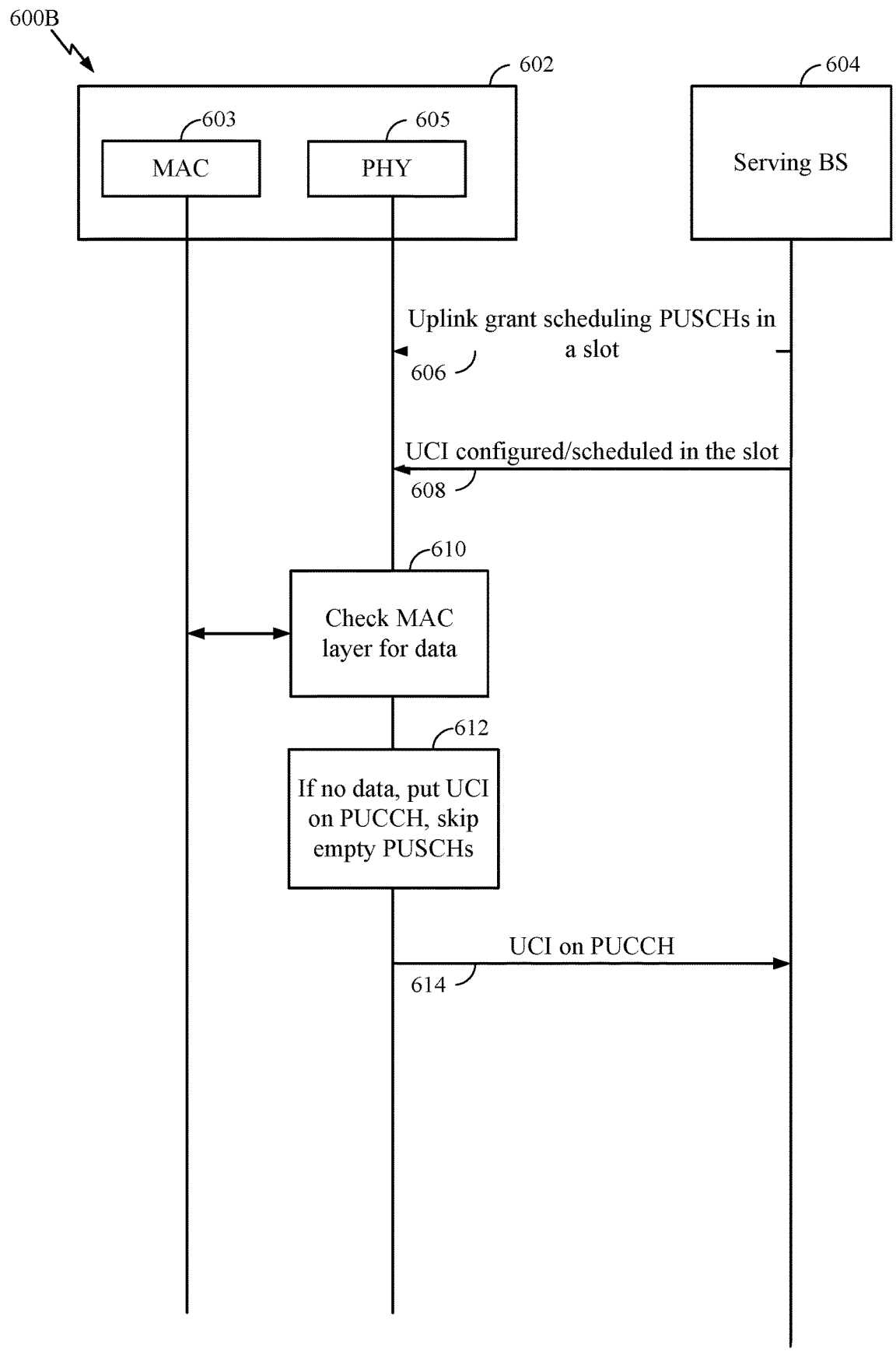
FIG. 6B is a more detailed call flow diagram illustrating example UCI transmission on PUCCH with PUSCH skipping, in accordance with aspects of the present disclosure.
Figure 6C:
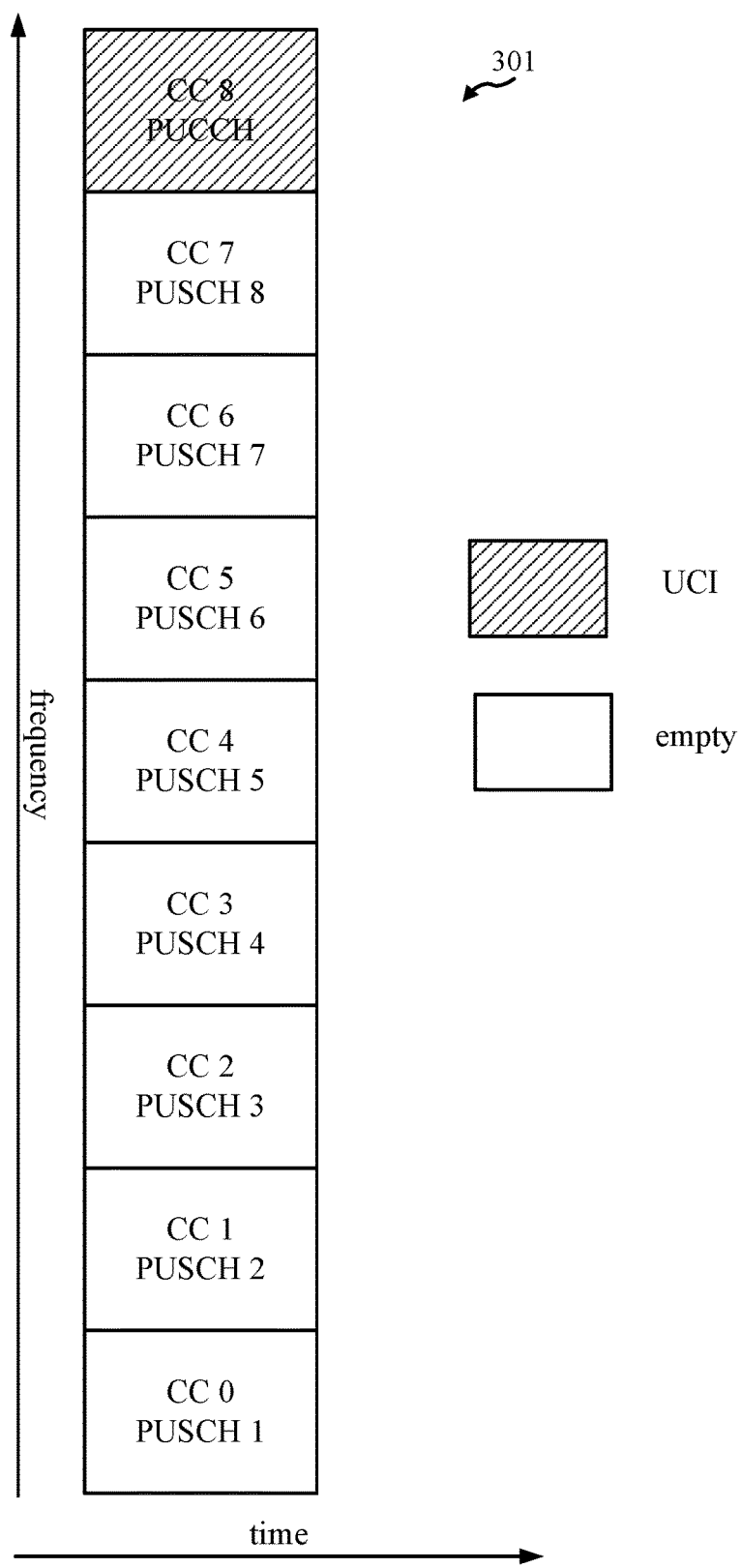
FIG. 6C is a block diagram showing example UCI transmitted in a PUCCH when there is no data assigned to a PUSCH in the slot, in accordance with aspects of the present disclosure.

As shown in FIG. 6A, at 606, the UE 602 receives an uplink grant (e.g., in a PDCCH) from the serving BS 606 (e.g., a gNB) scheduling PUSCHs in a slot (e.g., or other time interval). The PUSCHs may be scheduled on different CCs in the slot, for example, as shown in the slot 301 in the FIG. 3B.

At 608, the UE 602 is configured/scheduled by the serving BS 604 to send UCI (e.g., HARQ-ACK, SR, and/or CSI) in the slot. Although in FIG. 6A, the UCI configuring/scheduling (at 608) is shown after the uplink grant scheduling the PUSCHs (at 606), the UCI could be configured/scheduled before or at the same time as the uplink grant scheduling the PUSCHs. In some examples, the UCI may be dynamically scheduled. In some examples, the UE 602 may be configured with a timeline, trigger, or periodicity for sending the UCI.

At 610, the UE checks for MAC layer data. For example, as shown in FIG. 6B, the PHY layer 605 may query the MAC layer 603. The MAC layer 603 may periodically or in response to the query send the PHY layer 605 an indication of whether it has data. Thus, as compared to the UCI multiplexing illustrated in FIGS. 3A-3E, the UE 602 may know whether there is data to be transmitted before the UE 602 determines whether to multiplex UCI on PUSCH. In this case, as shown in FIG. 6A, if the UE 602 determines that there is no data to be transmitted then, at 612, the UE 602 may determine to put the UCI on PUCCH, and skip the empty PUSCHs (e.g., based on configured PUSCH skipping rule). For example, for empty PUSCHs (e.g., that do not have PUSCH data assigned to them in the slot), the UE 602 may determine to skip those empty PUSCHs (e.g., drop or not transmit) in the slot.

At 614, the UE 602 transmits the UCI in the PUCCH to the serving BS 604. Thus, in the illustrated examples in FIGS. 6A-6D, the UE 602 may avoid fallback (e.g., at the PHY layer) to transmitting the UCI on PUCCH after having prepared to transmit the UCI on PUSCH, thereby avoiding incurring the additional delay (e.g., due to falling back to prepare the PUCCH), in turn conserving power consumption.

Figure 6D:
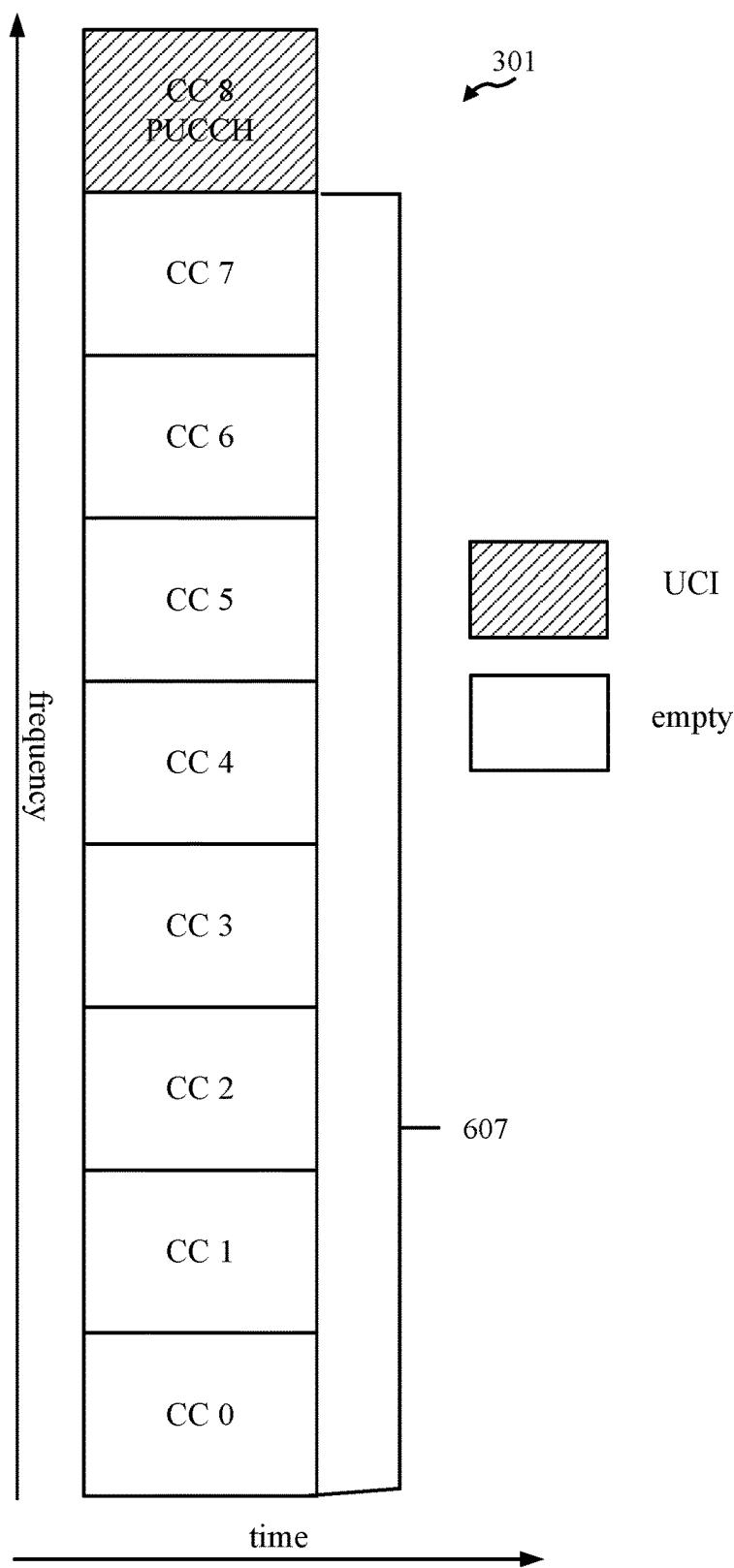
FIG. 6D is a block diagram showing example UCI transmitted in a PUCCH, and PUSCH skipping, when there is no data assigned to a PUSCH in the slot, in accordance with one or more aspects of the present disclosure.

Referring back to the illustrative example described above with respect to FIGS. 3A-3E, the UE 602 may be scheduled (e.g., at 606) with the eight PUSCHs (PUSCH 1, PUSCH 2, . . . , PUSCH 8) in a given slot, for example as shown in FIG. 3B. However, the UE 602 may determine based on the MAC layer check (e.g., at 610) that there is no data to be transmitted in the slot 301, and decide to put the UCI on the PUCCH as shown in FIG. 6C. Because the MAC layer does not have any data, the UE 602 drops the remaining PUSCHs 603 (e.g., PUSCHs 1-8) according to the configured PUSCH skipping as shown in FIG. 6D; however, the UE 602 does not need to fall back to transmitting the UCI on a PUCCH, because the UE 602 already put the UCI on PUCCH (e.g., at 612).

Figure 7A:
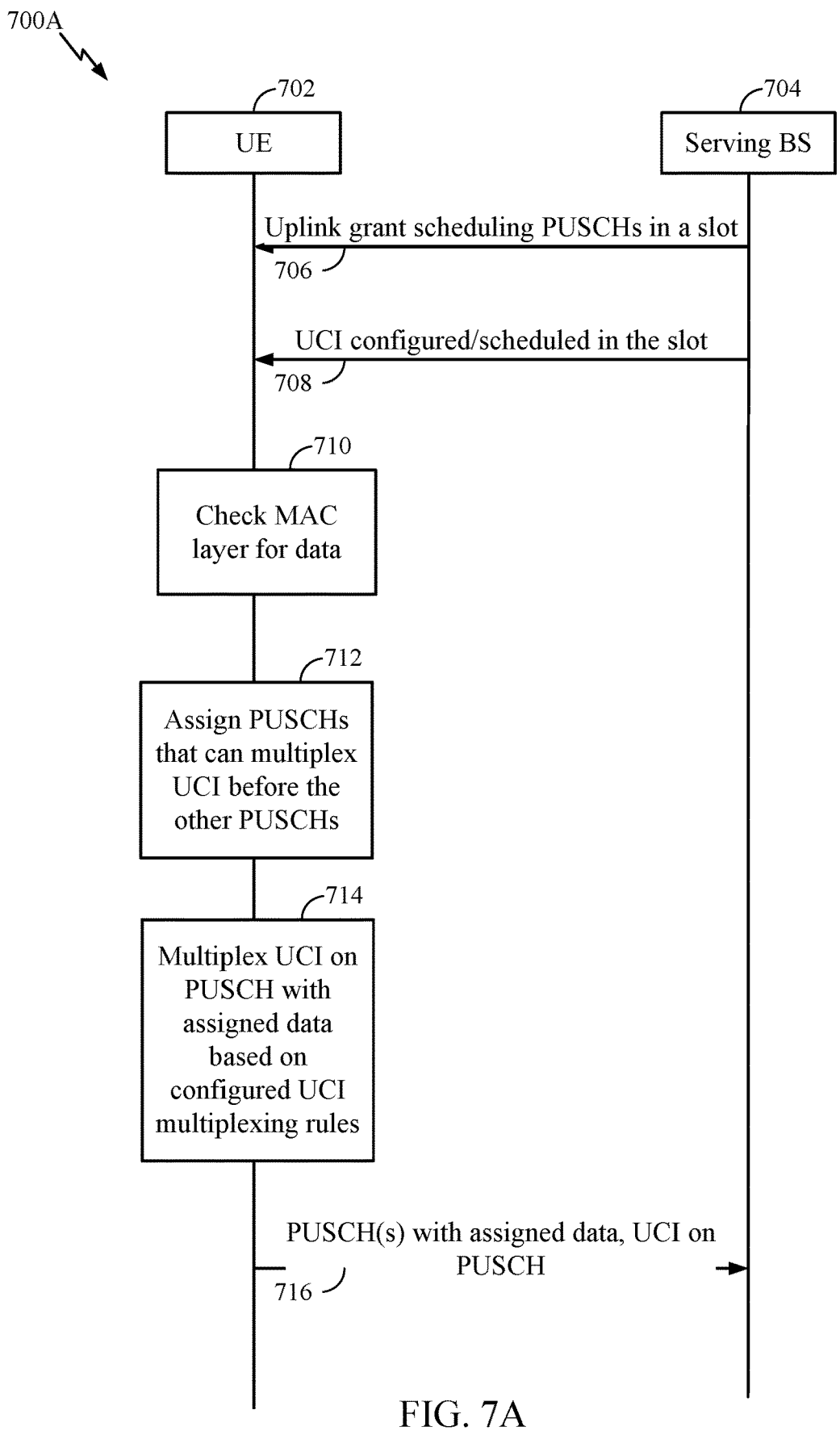
FIG. 7A is a call flow diagram illustrating example UCI multiplexing on PUSCH with PUSCH skipping, in accordance with aspects of the present disclosure.
Figure 7B:
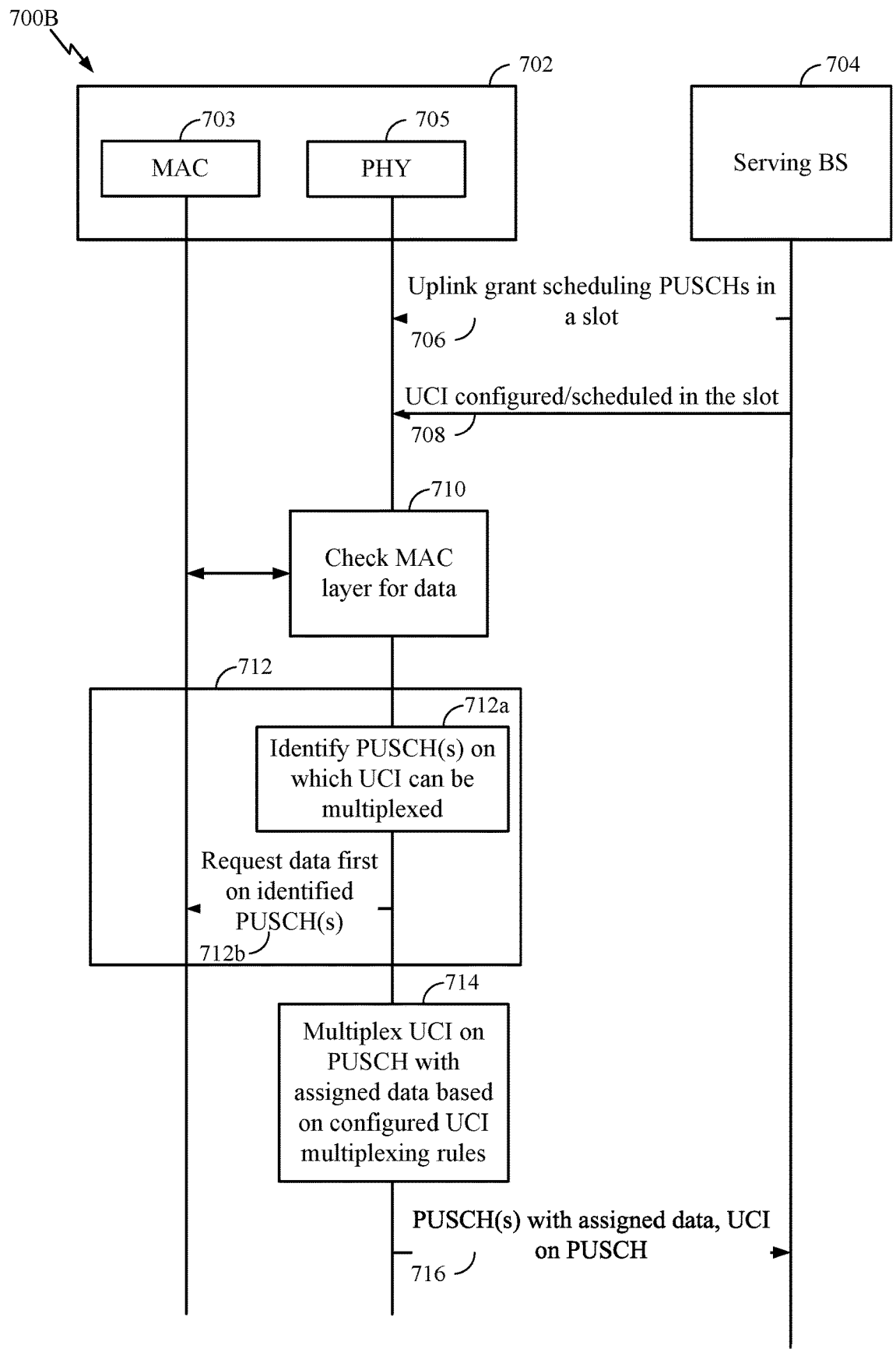
FIG. 7B is a more detailed call flow diagram illustrating example UCI multiplexing on PUSCH with PUSCH skipping, in accordance with aspects of the present disclosure.

FIG. 7A is a call flow 700A diagram illustrating example UCI multiplexing on PUSCH with PUSCH skipping, in accordance with aspects of the present disclosure. FIG. 7B is a more detailed call flow 700B illustrating the example UCI multiplexing on PUSCH with PUSCH skipping.

As shown in FIG. 7A, at 706-710, the UE 702 receives an uplink grant, is configured/scheduled by the serving BS 704 to send UCI, and checks for MAC layer data, which may be done as discussed above at 606-610 illustrated in FIG. 6A. In this case, as shown in FIG. 7A, if the UE 702 finds there is data to be transmitted (e.g., the MAC layer data, or buffer, is not empty) then, at 712, the UE 702 determines to put (e.g., assign) the data to one or more PUSCHs that can multiplex UCI before putting the data on other PUSCHs in the slot. For example, as shown in FIG. 7B, the PHY layer 705 may identify PUSCH(s) on which UCI can be multiplexed at 712*a* and, at 712*b*, request the MAC layer 703 to put MAC PDUs on the identified PUSCH(s) on which the UCI can be multiplexed, then on other PUSCHs. In this way, the UE 702 ensures that those PUSCHs on which UCI can be multiplexed will not be skipped, thereby, ensuring that the UE 702 multiplexes UCI on PUSCH in the slot. At 714, the UE 702 (e.g. the PHY layer 705) multiplexes the UCI on the PUSCHs with the assigned data. In some examples, the multiplexing at 714 may be based on configured UCI multiplexing rules. Thus, at 716, the UE 702 transmits the PUSCHs with assigned data in the slot, including the PUSCHs with UCI and assigned data multiplexed, and the UE 702 may drop any other PUSCHs that were not assigned any data.

Figure 7C:
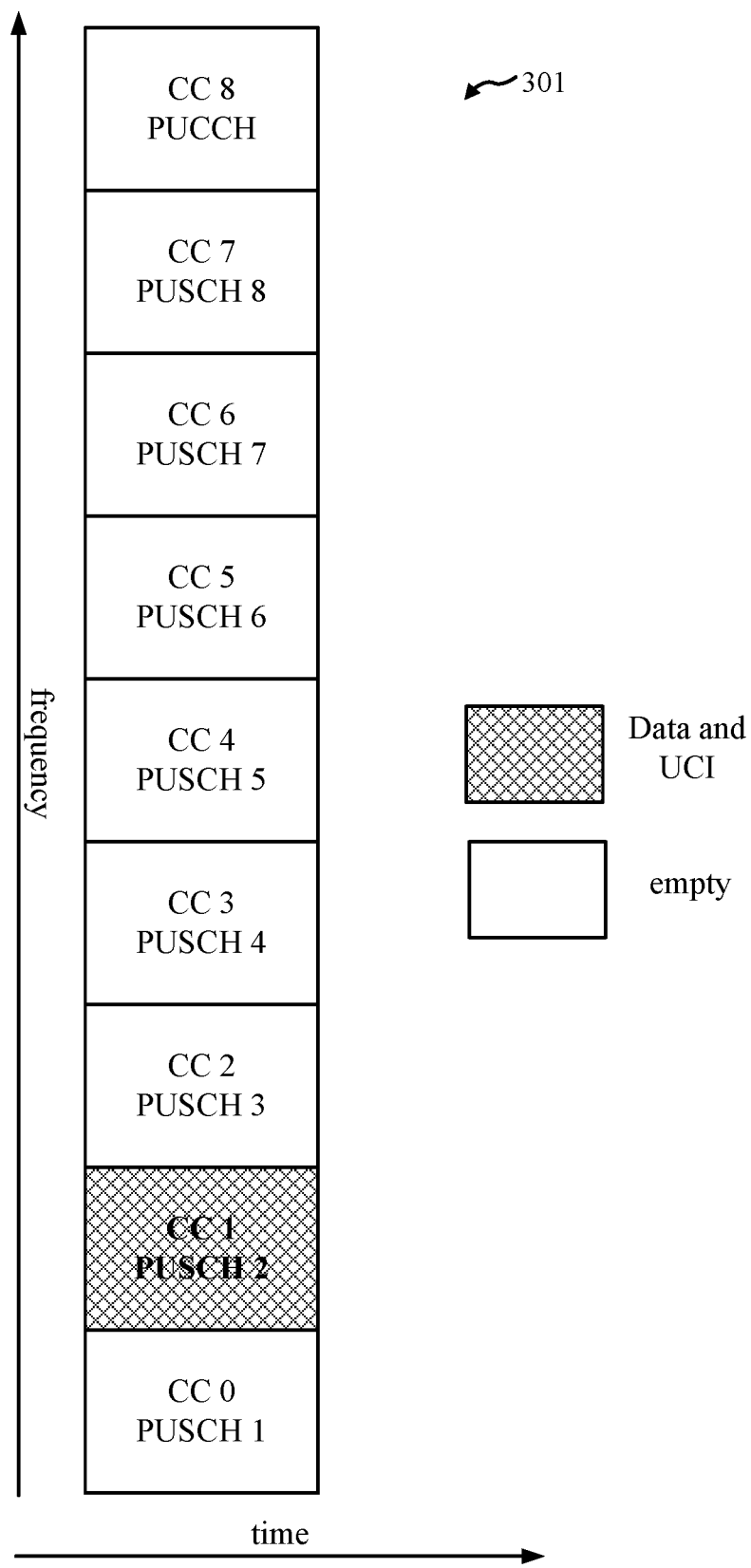
FIG. 7C is a block diagram showing example data assigned to a slot in which UCI is multiplexed, in accordance with aspects of the present disclosure.
Figure 7D:
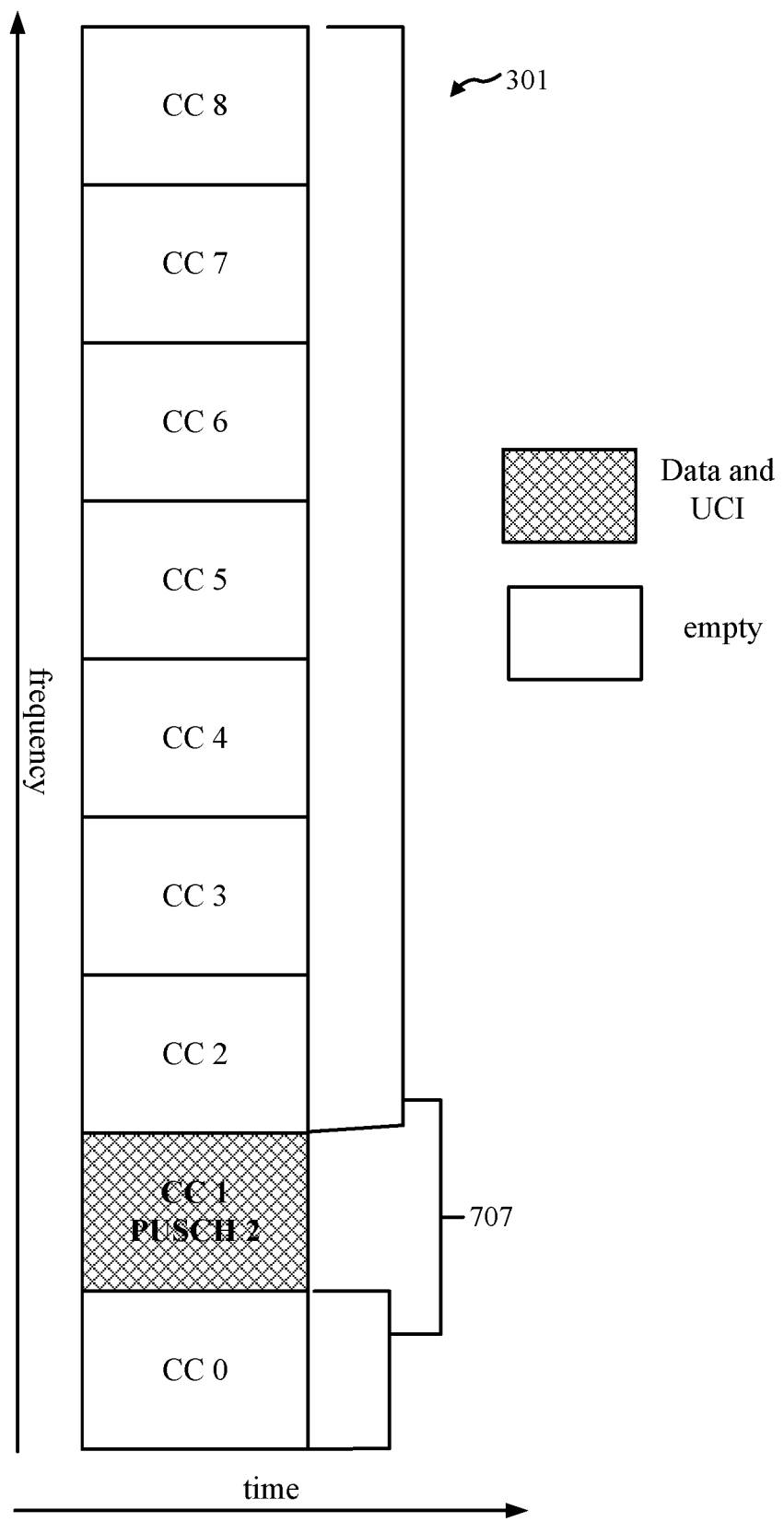
FIG. 7D is a block diagram showing example data assigned to a slot in which UCI is multiplexed, and PUSCH skipping, in accordance with one or more aspects of the present disclosure.

Referring back to the illustrative example above with respect to FIGS. 3A-3E, with the scheduled PUSCHs 1-8 in the slot 301 and UCI that can be multiplexed on the PUSCH 2. In this case, the UE 702 ensures that the PUSCH 2 is sent to the upper layer (e.g., MAC layer 703) first so that the PUSCH 2 will have data assigned and, therefore, will not be skipped, and can be transmitted with the multiplexed UCI as shown in FIG. 7C. Thus, in this illustrative example, the PUSCH 2 is transmitted with the UCI, the remaining PUSCHs 703 (e.g., PUSCH 1 and 3-8) may be skipped, and PUCCH is dropped, so only the PUSCH 2 is sent with UCI and data as shown in FIG. 7D. This may be more efficient than the case in which both the PUSCH and PUCCH are transmitted in the slot.

Thus, by performing the data check before preparing the UCI on PUCCH or PUSCH and before assigning the data to PUSCHs, the UE can avoid fallback to PUCCH, and may improve efficiency of resource usage by ensuring UCI can be multiplexed on PUSCH. These in turn, may save power, save resources, allow PHY layer PUSCH and UCI multiplexing processing and MAC TB forming in parallel, and improve the uplink PHY timeline.

Figure 8:
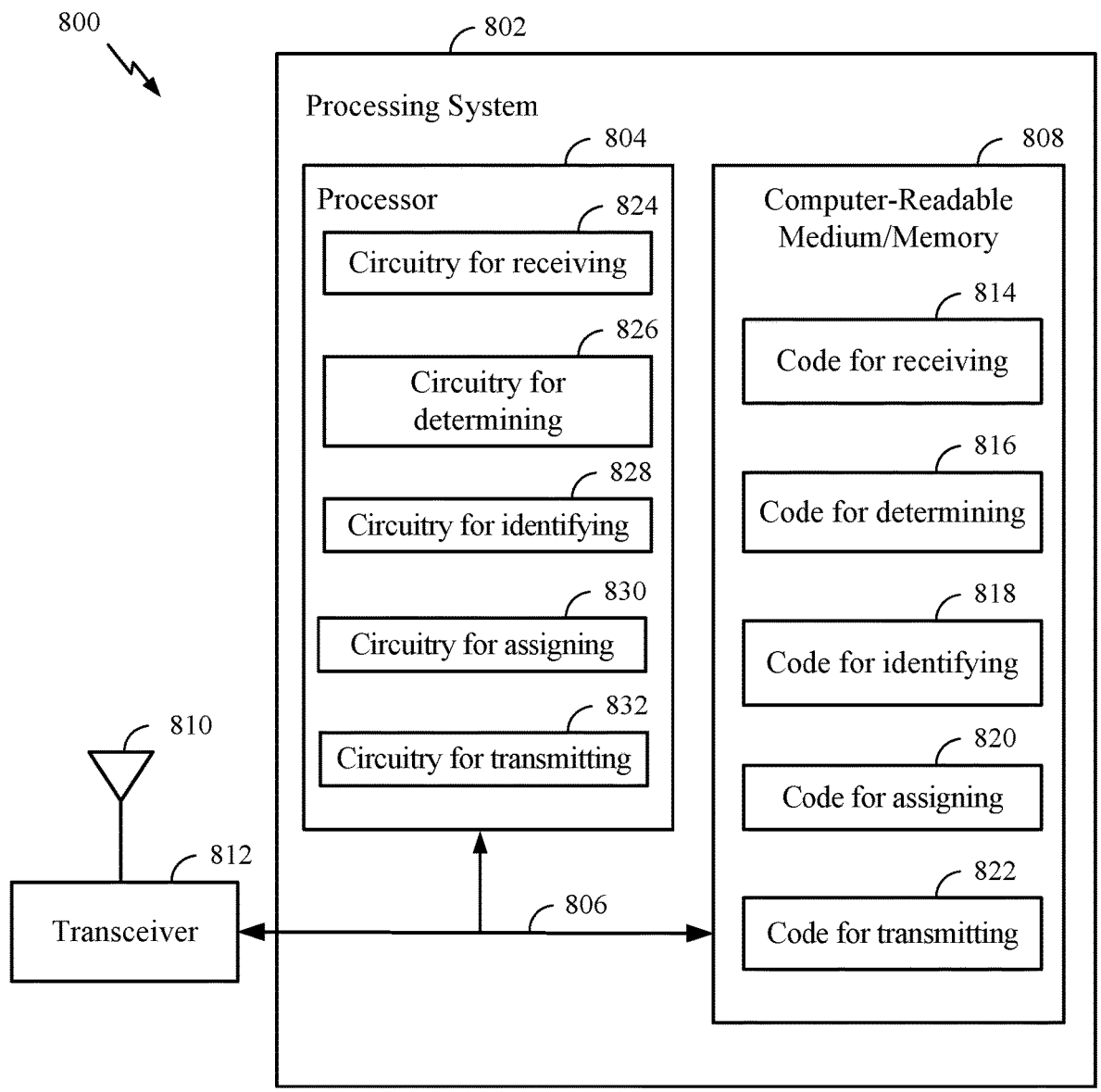
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIGS. 4-7C for UCI multiplexing with PUSCH skipping. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in at least one of FIGS. 4-7D, or other operations for performing the various techniques discussed herein for UCI multiplexing with PUSCH skipping. In certain aspects, computer-readable medium/memory 812 stores code 814 for receiving, such as code for receiving an uplink grant for transmission on a plurality of PUSCHs, the plurality of PUSCHs being located on different CCs, in accordance with one or more aspects of the present disclosure; code 816 for determining, such as code for determining whether PUSCH data is to be transmitted in the slot, in accordance with one or more aspects of the present disclosure, and/or code for determining, before assigning the PUSCH data to a PUSCH of the plurality of PUSCHs, to transmit UCI in the slot on one or more PUCCHs or on one or more PUSCHs of the plurality of PUSCHs based on the determination of whether the PUSCH data is to be transmitted in the slot, in accordance with one or more aspects of the present disclosure; code 818 for identifying, such as code identifying one or more PUSCHs of the plurality of PUSCHs on which UCI can be transmitted in a slot, in accordance with one or more aspects of the present disclosure; code 820 for assigning, such as code for assigning PUSCH data to the one or more identified PUSCHs on which the UCI can be transmitted before assigning PUSCH data to remaining PUSCHs of the plurality of PUSCHs, in accordance with one or more aspects of the present disclosure; and/or code 822 for transmitting, such as code for transmitting the UCI and the PUSCH data in the slot on the assigned PUSCHs, in accordance with one or more aspects of the present disclosure; and/or code for transmitting the UCI in the slot on the determined one or more PUCCHs or on the determined one or more PUSCHs, in accordance with one or more aspects of the present disclosure. In certain aspects, the processor 804 has circuitry configured to implement the code stored in the computer-readable medium/memory 812. The processor 804 includes circuitry 824 for receiving; circuitry 826 for determining; circuitry 828 for identifying; circuitry 830 for assigning; and/or circuitry 832 for transmitting, in accordance with one or more aspects of the present disclosure. The circuitries 824 to 832 can implement the operations provided by the codes 814 to 822 when the processor 804 executes the codes in the computer-readable medium/memory 812.

The techniques described herein may be used for various wireless communication technologies, such as NR (e.g., 5G NR or later releases), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more operations or actions for achieving the methods. The method operations and/or actions may be interchanged with one another without departing from the scope of the claims. In other words, unless a specific order of operations or actions is specified, the order and/or use of specific operations and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Example Aspects

In a first aspect, a method for wireless communications by a user equipment (UE) comprises receiving an uplink grant for transmission on a plurality of physical uplink shared channels (PUSCHs), the plurality of PUSCHs being located on different component carriers (CCs); identifying one or more PUSCHs of the plurality of PUSCHs on which uplink control information (UCI) can be transmitted in a slot; assigning PUSCH data to the one or more identified PUSCHs on which the UCI can be transmitted before assigning PUSCH data to remaining PUSCHs of the plurality of PUSCHs; and transmitting the UCI and the PUSCH data in the slot on the assigned PUSCHs. This may allow the UE to ensure the UCI can be multiplexed on PUSCH and can avoid falling back to PUCCH.

In a second aspect, alone or in combination with the first aspect, the UE determines that the PUSCH data is to be transmitted in the slot, the determining being performed before the identifying the one or more PUSCHs, of the plurality of PUSCHs, on which the UCI can be sent and before the assigning the PUSCH data. This may allow the UE determine to put the UCI on the PUCCH if there is no data or to request data be put first on the PUSCHs that can multiplex the UCI if there is data.

In a third aspect, alone or in combination with one or more of the first aspect and second aspects, determining that the PUSCH data is to be transmitted in the slot comprises receiving an indication corresponding to the PUSCH data at a physical (PHY) layer from a medium access control (MAC) layer, wherein the indication is received in response to a query from the PHY layer to the MAC layer, periodically, when new data is received at the MAC layer, or a combination thereof. This may allow the UE to make the determination of whether there is PUSCH to be transmitted in the slot.

In a fourth aspect, alone or in combination with one or more of the first through third aspects, transmitting the UCI and the PUSCH data in the slot on the assigned PUSCHs comprises rate-matching the UCI around the PUSCH data. Rate-matching may result in a lower effective code rate for the transmission.

In a fifth aspect, alone or in combination with one or more of the first through fourth aspects, the UE generates a MAC layer transport block (TB) and performs PHY layer multiplexing of the UCI and PUSCH data in parallel. This may improve the processing timeline.

In a sixth aspect, alone or in combination with one or more of the first through fifth aspects, identifying the one or more PUSCHs of the plurality of PUSCHs on which the UCI can be transmitted is based, at least in part, on one or more preconfigured rules. This may provide the UE with a mechanism for determining the PUSCHs that can multiplex UCI.

In a seventh aspect, alone or in combination with one or more of the first through sixth aspects, identifying the one or more PUSCHs of the plurality of PUSCHs on which the UCI can be transmitted is based, at least in part, on a configuration of a physical uplink control channel (PUCCH). This may provide the UE with a mechanism for determining the PUSCHs that can multiplex UCI.

In an eighth aspect, alone or in combination with one or more of the first through seventh aspects, the UE skips transmission of at least one empty PUSCH of the set of PUSCHs. This may allow the UE to transmit more efficiently by not wasting resources when there is no PUSCH data to be transmitted in the slot for that PUSCH.

In a ninth aspect, a method for wireless communications by a UE comprises receiving an uplink grant for transmission on a plurality of PUSCHs in a slot, the plurality of PUSCHs being located on different CCs; determining whether PUSCH data is to be transmitted in the slot; determining, before assigning the PUSCH data to a PUSCH of the plurality of PUSCHs, to transmit UCI in the slot on one or more PUCCHs or on one or more PUSCHs of the plurality of PUSCHs based on the determination of whether the PUSCH data is to be transmitted in the slot; and transmitting the UCI in the slot on the determined one or more PUCCHs or on the determined one or more PUSCHs.

In a tenth aspect, alone or in combination with the ninth aspect, determining whether the PUSCH data is to be transmitted in the slot comprises receiving an indication corresponding to the PUSCH at a PHY layer from a MAC layer, wherein the indication is received in response to a query from the PHY layer to the MAC layer, periodically, when new data is received at the MAC layer, or a combination thereof.

In an eleventh aspect, alone or in combination with the ninth or tenth aspect, determining to transmit the UCI in the slot on the one or more PUCCHs or on the one or more PUSCHs comprises determining to transmit the UCI in the slot on the one or more PUCCHs when the one or more PUSCHs are empty.

In a twelfth aspect, alone or in combination with one or more of the ninth through eleventh aspects, determining to transmit the UCI in the slot on the one or more PUCCHs or on the one or more PUSCHs comprises determining to transmit the UCI in the slot on the one or more PUSCHs when the PUSCH data is to be transmitted in the slot.

In a thirteenth aspect, alone or in combination with one or more of the ninth through twelfth aspects, the UE identifies the one or more PUSCHs as PUSCHs, of the plurality of PUSCHs, on which the UCI can be transmitted; and assigns PUSCH data to the one or more PUSCHs on which the UCI can be transmitted before assigning PUSCH data to the remaining PUSCHs of the plurality of PUSCHs.

In a fourteenth aspect, alone or in combination with one or more of the ninth through thirteenth aspects, the UE requests, by a PHY layer, a MAC layer to assign PUSCH data on the one or more PUSCHs on which the UCI can be sent before assigning PUSCH data on the remaining PUSCHs of the plurality of PUSCHs; or provides, by the PHY layer, to the MAC layer, an ordered list to build the set of PUSCHs, wherein the identified one or more PUSCHs are ordered in the ordered list before the remaining PUSCHs of the plurality of PUSCHs.

In a fifteenth aspect, alone or in combination with one or more of the ninth through fourteenth aspects, identifying the one or more PUSCHs on which the UCI can be transmitted is based, at least in part, on one or more preconfigured rules.

In a sixteenth aspect, alone or in combination with one or more of the ninth through fifteenth aspects, identifying the one or more PUSCHs on which the UCI can be transmitted is based, at least in part, on a configuration of a PUCCH.

In a seventeenth aspect, alone or in combination with one or more of the ninth through sixteenth aspects, transmitting the UCI in the slot on the one or more PUSCHs comprises rate-matching the UCI around the PUSCH data.

In an eighteenth aspect, alone or in combination with one or more of the ninth through seventeenth aspects, the UE generates a MAC layer TB and performs PHY layer multiplexing of the UCI and PUSCH data in parallel.

In a nineteenth aspect, alone or in combination with one or more of the ninth through eighteenth aspects, the UE skips transmission of at least one empty PUSCH of the plurality of PUSCHs.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for".

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 8), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in at least one of FIGS. 4-7D.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
receiving an uplink grant for transmission on a plurality of physical uplink shared channels (PUSCHs), the plurality of PUSCHs being located on different component carriers (CCs);
identifying one or more PUSCHs of the plurality of PUSCHs on which uplink control information (UCI) can be transmitted in a slot;
assigning PUSCH data, for transmission in the slot, to the one or more identified PUSCHs on which the UCI can be transmitted before assigning PUSCH data, for transmission in the slot, to remaining PUSCHs of the plurality of PUSCHs; and
transmitting the UCI and the PUSCH data in the slot on the assigned PUSCHs.

2. The method of claim 1, further comprising:
determining that the PUSCH data is to be transmitted in the slot, wherein the determining is performed before the identifying the one or more PUSCHs, of the plurality of PUSCHs, on which the UCI can be sent and before the assigning the PUSCH data.

3. The method of claim 2, wherein the determining that the PUSCH data is to be transmitted in the slot comprises receiving an indication corresponding to the PUSCH data at a physical (PHY) layer from a medium access control (MAC) layer, and wherein the indication is received in response to a query from the PHY layer to the MAC layer, periodically, when new data is received at the MAC layer, or a combination thereof.

4. The method of claim 1, wherein the transmitting the UCI and the PUSCH data in the slot on the assigned PUSCHs comprises rate-matching the UCI around the PUSCH data.

5. The method of claim 1, further comprising:
generating a medium access control (MAC) layer transport block (TB) and performing physical (PHY) layer multiplexing of the UCI and PUSCH data in parallel.

6. The method of claim 1, wherein the identifying the one or more PUSCHs of the plurality of PUSCHs on which the UCI can be transmitted is based, at least in part, on one or more preconfigured rules.

7. The method of claim 1, wherein the identifying the one or more PUSCHs of the plurality of PUSCHs on which the UCI can be transmitted is based, at least in part, on a configuration of a physical uplink control channel (PUCCH).

8. The method of claim 1, further comprising skipping transmission of at least one empty PUSCH of the plurality of PUSCHs.

9. A method for wireless communication by a user equipment (UE), comprising:
receiving an uplink grant for transmission on a plurality of physical uplink shared channels (PUSCHs) in a slot, the plurality of PUSCHs being located on different component carriers (CCs);
determining whether PUSCH data is to be transmitted in the slot;
determining, before assigning the PUSCH data to a PUSCH of the plurality of PUSCHs, whether to transmit uplink control information (UCI) in the slot on one or more physical uplink control channels (PUCCHs) or to transmit the UCI in the slot on one or more PUSCHs of the plurality of PUSCHs based on the determination of whether the PUSCH data is to be transmitted in the slot; and
transmitting the UCI in the slot on the determined one or more PUCCHs or on the determined one or more PUSCHs.

10. The method of claim 9, wherein the determining whether the PUSCH data is to be transmitted in the slot comprises receiving an indication corresponding to the PUSCH data at a physical (PHY) layer from a medium access control (MAC) layer, and wherein the indication is received in response to a query from the PHY layer to the MAC layer, periodically, when new data is received at the MAC layer, or a combination thereof.

11. The method of claim 9, wherein the determining to transmit the UCI in the slot on the one or more PUCCHs or on the one or more PUSCHs comprises determining to transmit the UCI in the slot on the one or more PUCCHs when the one or more PUSCHs are empty.

12. The method of claim 9, wherein the determining to transmit the UCI in the slot on the one or more PUCCHs or on the one or more PUSCHs comprises determining to transmit the UCI in the slot on the one or more PUSCHs when the PUSCH data is to be transmitted in the slot.

13. The method of claim 12, further comprising:
identifying the one or more PUSCHs as PUSCHs, of the plurality of PUSCHs, on which the UCI can be transmitted; and
assigning PUSCH data to the one or more PUSCHs on which the UCI can be transmitted before assigning PUSCH data to remaining PUSCHs of the plurality of PUSCHs.

14. The method of claim 13, further comprising:
requesting, by a physical (PHY) layer, a medium access control (MAC) layer to assign PUSCH data on the one or more PUSCHs on which the UCI can be sent before assigning PUSCH data on the remaining PUSCHs of the plurality of PUSCHs; or
providing, by the PHY layer, to the MAC layer, an ordered list to build the plurality of PUSCHs, wherein the identified one or more PUSCHs are ordered in the ordered list before the remaining PUSCHs of the plurality of PUSCHs.

15. The method of claim 13, wherein the identifying the one or more PUSCHs on which the UCI can be transmitted is based, at least in part, on one or more preconfigured rules.

16. The method of claim 13, wherein the identifying the one or more PUSCHs on which the UCI can be transmitted is based, at least in part, on a configuration of a PUCCH.

17. The method of claim 12, wherein the transmitting the UCI in the slot on the one or more PUSCHs comprises rate-matching the UCI around the PUSCH data.

18. The method of claim 12, further comprising generating a medium access control (MAC) layer transport block (TB) and performing physical (PHY) layer multiplexing of the UCI and PUSCH data in parallel.

19. The method of claim 9, further comprising skipping transmission of at least one empty PUSCH of the plurality of PUSCHs.

20. An apparatus for wireless communication, comprising:
a memory; and
at least one processor coupled with the memory, the processor and memory configured to:
receive an uplink grant for transmission on a plurality of physical uplink shared channels (PUSCHs), the plurality of PUSCHs being located on different component carriers (CCs);
identify one or more PUSCHs of the plurality of PUSCHs on which uplink control information (UCI) can be transmitted in a slot;
assign PUSCH data, for transmission in the slot, to the one or more identified PUSCHs on which the UCI can be transmitted before assigning PUSCH data, for transmission in the slot, to remaining PUSCHs of the plurality of PUSCHs; and
transmit the UCI and the PUSCH data in the slot on the assigned PUSCHs.

21. The apparatus of claim 20, wherein the processor and memory are further configured to:
determine that the PUSCH data is to be transmitted in the slot, wherein the PUSCH data to be transmitted in the slot is determined before the one or more PUSCHs, of the plurality of PUSCHs, on which the UCI can be sent are identified and before the PUSCH data is assigned.

22. The apparatus of claim 21, wherein the processor and memory being configured to determine that the PUSCH data is to be transmitted in the slot comprises the processor and memory being configured to:
receive an indication corresponding to the PUSCH data at a physical (PHY) layer from a medium access control (MAC) layer, wherein the indication is received in response to a query from the PHY layer to the MAC layer, periodically, when new data is received at the MAC layer, or a combination thereof.

23. The apparatus of claim 20, wherein the processor and memory are further configured to transmit the UCI and the PUSCH data in the slot on the assigned PUSCHs by rate-matching the UCI around the PUSCH data.

24. The apparatus of claim 20, wherein the processor and memory are further configured to:
generate a medium access control (MAC) layer transport block (TB) and perform physical (PHY) layer multiplexing of the UCI and PUSCH data in parallel.

25. The apparatus of claim 20, wherein the processor and memory are further configured to identify the one or more PUSCHs of the plurality of PUSCHs on which the UCI can be transmitted based, at least in part, on one or more preconfigured rules.

26. The apparatus of claim 20, wherein the processor and memory are further configured to identify the one or more PUSCHs of the plurality of PUSCHs on which the UCI can be transmitted based, at least in part, on a configuration of a physical uplink control channel (PUCCH).

27. The apparatus of claim 20, wherein the processor and memory are further configured to:
skip transmission of at least one empty PUSCH of the plurality of PUSCHs.

28. An apparatus for wireless communication, comprising:
a memory; and
at least one processor coupled with the memory, the processor and memory configured to:
receive an uplink grant for transmission on a plurality of physical uplink shared channels (PUSCHs) in a slot, the plurality of PUSCHs being located on different component carriers (CCs);
determine whether PUSCH data is to be transmitted in the slot;
determine, before assigning the PUSCH data to a PUSCH of the plurality of PUSCHs, whether to transmit uplink control information (UCI) in the slot on one or more physical uplink control channels (PUCCHs) or to transmit the UCI on one or more PUSCHs of the plurality of PUSCHs based on the determination of whether the PUSCH data is to be transmitted in the slot; and
transmit the UCI in the slot on the determined one or more PUCCHs or on the determined one or more PUSCHs.

29. The apparatus of claim 28, wherein the processor and memory being configured to determine whether the PUSCH data is to be transmitted in the slot comprises the processor and memory being configured to:
receive an indication at a physical (PHY) layer from a medium access control (MAC) layer, and wherein the indication is received in response to a query from the PHY layer to the MAC layer, periodically, when new data is received at the MAC layer, or a combination thereof.

30. The apparatus of claim 28, wherein the processor and memory are further configured to determine to transmit the UCI in the slot on the one or more PUCCHs or on the one or more PUSCHs by determining to transmit the UCI in the slot on the one or more PUCCHs when the one or more PUSCHs are empty.

31. The apparatus of claim 28, wherein the processor and memory are further configured to determine to transmit the UCI in the slot on the one or more PUCCHs or on the one or more PUSCHs by determining to transmit the UCI in the slot on the one or more PUSCHs when the PUSCH data is to be transmitted in the slot.

32. The apparatus of claim 31, wherein the processor and memory are further configured to:
identify the one or more PUSCHs as PUSCHs, of the plurality of PUSCHs, on which the UCI can be transmitted; and
assign PUSCH data to the one or more PUSCHs on which the UCI can be transmitted before assigning PUSCH data to remaining PUSCHs of the plurality of PUSCHs.

33. The apparatus of claim 32, wherein the processor and memory are configured to:
request, by a physical (PHY) layer, a medium access control (MAC) layer to assign PUSCH data on the one or more PUSCHs on which the UCI can be sent before assigning PUSCH data on the remaining PUSCHs of the plurality of PUSCHs; or
provide, by the PHY layer, to the MAC layer, an ordered list to build the plurality of PUSCHs, wherein the identified one or more PUSCHs are ordered in the ordered list before the remaining PUSCHs of the plurality of PUSCHs.

34. The apparatus of claim 32, wherein the processor and memory are further configured to identify the one or more PUSCHs on which the UCI can be transmitted based, at least in part, on one or more preconfigured rules.

35. The apparatus of claim 32, wherein the processor and memory are further configured to identify the one or more PUSCHs on which the UCI can be transmitted based, at least in part, on a configuration of a PUCCH.

36. The apparatus of claim 31, wherein the processor and memory are further configured to transmit the UCI in the slot on the one or more PUSCHs by rate-matching the UCI around the PUSCH data.

37. The apparatus of claim 31, wherein the processor and memory are further configured to:
generate a medium access control (MAC) layer transport block (TB) and perform physical (PHY) layer multiplexing of the UCI and PUSCH data in parallel.

38. The apparatus of claim 28, wherein the processor and memory are further configured to:
skip transmission of at least one empty PUSCH of the plurality of PUSCHs.

39. An apparatus for wireless communication, comprising:
means for receiving an uplink grant for transmission on a plurality of physical uplink shared channels (PUSCHs), the plurality of PUSCHs being located on different component carriers (CCs);
means for identifying one or more PUSCHs of the plurality of PUSCHs on which uplink control information (UCI) can be transmitted in a slot;
means for assigning PUSCH data, for transmission in the slot, to the one or more identified PUSCHs on which the UCI can be transmitted before assigning PUSCH data, for transmission in the slot, to remaining PUSCHs of the plurality of PUSCHs; and
means for transmitting the UCI and the PUSCH data in the slot on the assigned PUSCHs.

40. An apparatus for wireless communication, comprising:
means for receiving an uplink grant for transmission on a plurality of physical uplink shared channels (PUSCHs) in a slot, the plurality of PUSCHs being located on different component carriers (CCs);
means for determining whether PUSCH data is to be transmitted in the slot;
means for determining, before assigning the PUSCH data to a PUSCH of the plurality of PUSCHs, whether to transmit uplink control information (UCI) in the slot on one or more physical uplink control channels (PUCCHs) or to transmit the UCI on one or more PUSCHs of the plurality of PUSCHs based on the determination of whether the PUSCH data is to be transmitted in the slot; and
means for transmitting the UCI in the slot on the determined one or more PUCCHs or on the determined one or more PUSCHs.

41. A non-transitory computer readable medium storing computer executable code thereon, comprising:
code for receiving an uplink grant for transmission on a plurality of physical uplink shared channels (PUSCHs), the plurality of PUSCHs being located on different component carriers (CCs);
code for identifying one or more PUSCHs of the plurality of PUSCHs on which uplink control information (UCI) can be transmitted in a slot;
code for assigning PUSCH data, for transmission in the slot, to the one or more identified PUSCHs on which the UCI can be transmitted before assigning PUSCH data, for transmission in the slot, to remaining PUSCHs of the plurality of PUSCHs; and
code for transmitting the UCI and the PUSCH data in the slot on the assigned PUSCHs.

42. The non-transitory computer readable medium of claim 41, further comprising:
code for determining that the PUSCH data is to be transmitted in the slot, wherein the code for determining is configured to be executed before executing the code for identifying the one or more PUSCHs, of the plurality of PUSCHs, on which the UCI can be sent and before executing the code for assigning the PUSCH data.

43. The non-transitory computer readable medium of claim 42, wherein the code for determining that the PUSCH data is to be transmitted in the slot comprises code for receiving an indication corresponding to the PUSCH data at a physical (PHY) layer from a medium access control (MAC) layer, and wherein the indication is received in response to a query from the PHY layer to the MAC layer, periodically, when new data is received at the MAC layer, or a combination thereof.

44. A non-transitory computer readable medium storing computer executable code thereon, comprising:
code for receiving an uplink grant for transmission on a plurality of physical uplink shared channels (PUSCHs) in a slot, the plurality of PUSCHs being located on different component carriers (CCs);
code for determining whether PUSCH data is to be transmitted in the slot;

code for determining, before assigning the PUSCH data to a PUSCH of the plurality of PUSCHs, whether to transmit uplink control information (UCI) in the slot on one or more physical uplink control channels (PUCCHs) or to transmit the UCI on one or more PUSCHs of the plurality of PUSCHs based on the determination of whether the PUSCH data is to be transmitted in the slot; and code for transmitting the UCI in the slot on the determined one or more PUCCHs or on the determined one or more PUSCHs.

45. The apparatus of claim 39, further comprising:
means for determining that the PUSCH data is to be transmitted in the slot, wherein the PUSCH data is determined to be transmitted in the slot before the one or more PUSCHs, of the plurality of PUSCHs, on which the UCI can be sent are identified and before the PUSCH data is assigned.

46. The apparatus of claim 45, wherein the means for determining that the PUSCH data is to be transmitted in the slot comprises means for receiving an indication corresponding to the PUSCH data at a physical (PHY) layer from a medium access control (MAC) layer, and wherein the indication is received in response to a query from the PHY layer to the MAC layer, periodically, when new data is received at the MAC layer, or a combination thereof.

47. The apparatus of claim 39, wherein the means for transmitting the UCI and the PUSCH data in the slot on the assigned PUSCHs comprises means for rate-matching the UCI around the PUSCH data.

48. The apparatus of claim 39, further comprising:
means for generating a medium access control (MAC) layer transport block (TB) and performing physical (PHY) layer multiplexing of the UCI and PUSCH data in parallel.

49. The apparatus of claim 39, wherein the means for identifying the one or more PUSCHs of the plurality of PUSCHs on which the UCI can be transmitted comprises means for identifying the one or more PUSCHs of the plurality of PUSCHs on which the UCI can be transmitted based, at least in part, on one or more preconfigured rules.

50. The apparatus of claim 39, wherein the means for identifying the one or more PUSCHs of the plurality of PUSCHs on which the UCI can be transmitted comprises means for identifying the one or more PUSCHs of the plurality of PUSCHs on which the UCI can be transmitted based, at least in part, on a configuration of a physical uplink control channel (PUCCH).

51. The apparatus of claim 39, further comprising means for skipping transmission of at least one empty PUSCH of the plurality of PUSCHs.

52. The apparatus of claim 40, wherein the means for determining whether the PUSCH data is to be transmitted in the slot comprises means for receiving an indication corresponding to the PUSCH data at a physical (PHY) layer from a medium access control (MAC) layer, and wherein the indication is received in response to a query from the PHY layer to the MAC layer, periodically, when new data is received at the MAC layer, or a combination thereof.

53. The apparatus of claim 40, wherein the means for determining to transmit the UCI in the slot on the one or more PUCCHs or on the one or more PUSCHs comprises means for determining to transmit the UCI in the slot on the one or more PUCCHs when the one or more PUSCHs are empty.

54. The apparatus of claim 40, wherein the means for determining to transmit the UCI in the slot on the one or more PUCCHs or on the one or more PUSCHs comprises means for determining to transmit the UCI in the slot on the one or more PUSCHs when the PUSCH data is to be transmitted in the slot.

55. The apparatus of claim 54, further comprising:
means for identifying the one or more PUSCHs as PUSCHs, of the plurality of PUSCHs, on which the UCI can be transmitted; and
means for assigning PUSCH data to the one or more PUSCHs on which the UCI can be transmitted before assigning PUSCH data to remaining PUSCHs of the plurality of PUSCHs.

56. The apparatus of claim 55, further comprising:
means for requesting, by a physical (PHY) layer, a medium access control (MAC) layer to assign PUSCH data on the one or more PUSCHs on which the UCI can be sent before assigning PUSCH data on the remaining PUSCHs of the plurality of PUSCHs; or
means for providing, by the PHY layer, to the MAC layer, an ordered list to build the plurality of PUSCHs, wherein the identified one or more PUSCHs are ordered in the ordered list before the remaining PUSCHs of the plurality of PUSCHs.

57. The apparatus of claim 55, wherein the means for identifying the one or more PUSCHs on which the UCI can be transmitted comprises means for identifying the one or more PUSCHs on which the UCI can be transmitted based, at least in part, on one or more preconfigured rules.

58. The apparatus of claim 55, wherein the means for identifying the one or more PUSCHs on which the UCI can be transmitted comprises means for identifying the one or more PUSCHs on which the UCI can be transmitted based, at least in part, on a configuration of a PUCCH.

59. The apparatus of claim 54, wherein the means for transmitting the UCI in the slot on the one or more PUSCHs comprises means for rate-matching the UCI around the PUSCH data.

60. The apparatus of claim 54, further comprising means for generating a medium access control (MAC) layer transport block (TB) and performing physical (PHY) layer multiplexing of the UCI and PUSCH data in parallel.

61. The apparatus of claim 40, further comprising means for skipping transmission of at least one empty PUSCH of the plurality of PUSCHs.

62. The non-transitory computer readable medium of claim 41, wherein the code for transmitting the UCI and the PUSCH data in the slot on the assigned PUSCHs comprises code for rate-matching the UCI around the PUSCH data.

63. The non-transitory computer readable medium of claim 41, further comprising:
code for generating a medium access control (MAC) layer transport block (TB) and performing physical (PHY) layer multiplexing of the UCI and PUSCH data in parallel.

64. The non-transitory computer readable medium of claim 41, wherein the code for identifying the one or more PUSCHs of the plurality of PUSCHs on which the UCI can be transmitted comprises code for identifying the one or more PUSCHs of the plurality of PUSCHs on which the UCI can be transmitted based, at least in part, on one or more preconfigured rules.

65. The non-transitory computer readable medium of claim 41, wherein the code for identifying the one or more PUSCHs of the plurality of PUSCHs on which the UCI can be transmitted comprises code for identifying the one or more PUSCHs of the plurality of PUSCHs on which the UCI can be transmitted based, at least in part, on a configuration of a physical uplink control channel (PUCCH).

66. The non-transitory computer readable medium of claim 41, further comprising code for skipping transmission of at least one empty PUSCH of the plurality of PUSCHs.

67. The non-transitory computer readable medium of claim 44, wherein the code for determining whether the PUSCH data is to be transmitted in the slot comprises code for receiving an indication corresponding to the PUSCH data at a physical (PHY) layer from a medium access control (MAC) layer, and wherein the indication is received in response to a query from the PHY layer to the MAC layer, periodically, when new data is received at the MAC layer, or a combination thereof.

68. The non-transitory computer readable medium of claim 44, wherein the code for determining to transmit the UCI in the slot on the one or more PUCCHs or on the one or more PUSCHs comprises code for determining to transmit the UCI in the slot on the one or more PUCCHs when the one or more PUSCHs are empty.

69. The non-transitory computer readable medium of claim 44, wherein the code for determining to transmit the UCI in the slot on the one or more PUCCHs or on the one or more PUSCHs comprises code for determining to transmit the UCI in the slot on the one or more PUSCHs when the PUSCH data is to be transmitted in the slot.

70. The non-transitory computer readable medium of claim 69, further comprising:
 code for identifying the one or more PUSCHs as PUSCHs, of the plurality of PUSCHs, on which the UCI can be transmitted; and
 code for assigning PUSCH data to the one or more PUSCHs on which the UCI can be transmitted before assigning PUSCH data to remaining PUSCHs of the plurality of PUSCHs.

71. The non-transitory computer readable medium of claim 70, further comprising:
 code for requesting, by a physical (PHY) layer, a medium access control (MAC) layer to assign PUSCH data on the one or more PUSCHs on which the UCI can be sent before assigning PUSCH data on the remaining PUSCHs of the plurality of PUSCHs; or
 code for providing, by the PHY layer, to the MAC layer, an ordered list to build the plurality of PUSCHs, wherein the identified one or more PUSCHs are ordered in the ordered list before the remaining PUSCHs of the plurality of PUSCHs.

72. The non-transitory computer readable medium of claim 70, wherein the code for identifying the one or more PUSCHs on which the UCI can be transmitted comprises code for identifying the one or more PUSCHs on which the UCI can be transmitted based, at least in part, on one or more preconfigured rules.

73. The non-transitory computer readable medium of claim 70, wherein the code for identifying the one or more PUSCHs on which the UCI can be transmitted comprises code for identifying the one or more PUSCHs on which the UCI can be transmitted based, at least in part, on a configuration of a PUCCH.

74. The non-transitory computer readable medium of claim 69, wherein the code for transmitting the UCI in the slot on the one or more PUSCHs comprises code for rate-matching the UCI around the PUSCH data.

75. The non-transitory computer readable medium of claim 69, further comprising code for generating a medium access control (MAC) layer transport block (TB) and performing physical (PHY) layer multiplexing of the UCI and PUSCH data in parallel.

76. The non-transitory computer readable medium of claim 44, further comprising code for skipping transmission of at least one empty PUSCH of the plurality of PUSCHs.

* * * * *